(12) United States Patent
Kajiyama et al.

(10) Patent No.: US 10,931,113 B2
(45) Date of Patent: Feb. 23, 2021

(54) POWER CONVERSION DEVICE AND POWER SYSTEM PERFORMING PROTECTION CONTROL FOR SUPPRESSING RECEIVED POWER

(71) Applicant: Mitsubishi Electric Corporation, Chiyoda-ku (JP)

(72) Inventors: Takuya Kajiyama, Chiyoda-ku (JP); Toshiyuki Fujii, Chiyoda-ku (JP); Osamu Mori, Chiyoda-ku (JP); Kaho Mukunoki, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 164 days.

(21) Appl. No.: 16/077,504

(22) PCT Filed: Sep. 28, 2016

(86) PCT No.: PCT/JP2016/078587
§ 371 (c)(1),
(2) Date: Aug. 13, 2018

(87) PCT Pub. No.: WO2017/158891
PCT Pub. Date: Sep. 21, 2017

(65) Prior Publication Data
US 2019/0052086 A1 Feb. 14, 2019

(30) Foreign Application Priority Data

Mar. 15, 2016 (JP) .............................. JP2016-050348

(51) Int. Cl.
*H02J 3/36* (2006.01)
*H02J 1/00* (2006.01)
(Continued)

(52) U.S. Cl.
CPC ............... *H02J 3/36* (2013.01); *H02J 1/00* (2013.01); *H02M 1/32* (2013.01); *H02M 5/458* (2013.01);
(Continued)

(58) Field of Classification Search
CPC .... H02J 1/00; H02J 3/00; H02M 1/00; H02M 5/00; H02M 7/00; Y02E 60/60
See application file for complete search history.

(56) References Cited

U.S. PATENT DOCUMENTS

| 4,578,743 | A | * | 3/1986 | Inokuchi | ................... | H02J 3/36 363/35 |
| 4,941,079 | A | * | 7/1990 | Ooi | .......................... | H02J 3/36 363/132 |

(Continued)

FOREIGN PATENT DOCUMENTS

| EP | 0 129 250 A2 | 12/1984 |
| EP | 2 528 184 A1 | 11/2012 |

(Continued)

OTHER PUBLICATIONS

Theodoros D. Vrionis, et al., "Control of an HVdc Link Connecting a Wind Farm to the Grid for Fault Ride-Through Enhancement" IEEE Transactions on Power Systems, vol. 22, No. 4, XP011194267, Nov. 1, 2007, pp. 2039-2047 (Year: 2007).*

(Continued)

*Primary Examiner* — Rexford N Barnie
*Assistant Examiner* — Joseph N Inge
(74) *Attorney, Agent, or Firm* — Xsensus LLP

(57) ABSTRACT

A power conversion device which is connected between an electric generation grid and a demand area grid and performs power conversion includes: a power converter which is connected to an electric generation grid and which converts AC power received from the electric generation grid to DC (Continued)

power and transmits the DC power via DC bus; and a control device for controlling the power converter. The control device includes a detection unit for detecting DC current of the DC bus, and a protection control unit for performing protection control for suppressing an amount of power received from the electric generation grid, on the basis of variation in the DC current, thereby continuing operation in the case of disturbance in the demand area grid.

21 Claims, 21 Drawing Sheets

(51) Int. Cl.
    H02M 1/32      (2007.01)
    H02M 5/458     (2006.01)
    H02M 7/483     (2007.01)
    H02M 7/219     (2006.01)
    H02M 7/5387    (2007.01)
    H02M 1/00      (2006.01)

(52) U.S. Cl.
    CPC ........... *H02M 7/219* (2013.01); *H02M 7/483* (2013.01); *H02M 7/5387* (2013.01); *H02M 2001/0009* (2013.01); *H02M 2001/0025* (2013.01); *H02M 2001/0096* (2013.01); *H02M 2007/4835* (2013.01); *Y02E 60/60* (2013.01)

(56) References Cited

U.S. PATENT DOCUMENTS

| | | | | |
|---|---|---|---|---|
| 2010/0308649 | A1* | 12/2010 | Kono | H02M 7/53875 |
| | | | | 307/9.1 |
| 2012/0300510 | A1* | 11/2012 | Jensen | H02J 3/36 |
| | | | | 363/35 |
| 2015/0333637 | A1* | 11/2015 | Izumi | H02M 7/219 |
| | | | | 363/21.01 |
| 2015/0365020 | A1* | 12/2015 | Ogino | H02M 1/36 |
| | | | | 318/400.21 |
| 2017/0047860 | A1* | 2/2017 | Fujii | H02M 7/2173 |

FOREIGN PATENT DOCUMENTS

| | | | |
|---|---|---|---|
| EP | 2 863 512 | A1 | 4/2015 |
| JP | 60-5781 | A | 1/1985 |
| JP | 1-311825 | A | 12/1989 |
| JP | 11-332096 | A | 11/1999 |
| JP | 2001-177985 | A | 6/2001 |
| JP | 2003-37939 | A | 2/2003 |
| JP | 2015-80354 | A | 4/2015 |
| WO | WO 2012/116738 | A1 | 9/2012 |
| WO | WO 2015/178376 | A1 | 11/2015 |

OTHER PUBLICATIONS

European Search Report dated Mar. 8, 2019 in Patent Application No. 16894508.7, 10 pages.
Theodoros D. Vrionis, et al., "Control of an HVdc Link Connecting a Wind Farm to the Grid for Fault Ride-Through Enhancement" IEEE Transactions on Power Systems, vol. 22, No. 4, XP011194267, Nov. 1, 2007, pp. 2039-2047.
Miteshkumar Popat, et al., "Fault Ride-Through of PMSG-Based Offshore Wind Farm Connected Through Cascaded Current Source Converter-Based HVDC" Power Electronics and Machines in Wind Applications (PEMWA), 2012 IEEE, XP032245166, Jul. 16, 2012, pp. 1-7.
Office Action dated Dec. 4, 2019 in European Patent Application No. 16894508.7.
International Search Report dated Nov. 15, 2016, in PCT/JP2016/078587 filed Sep. 28, 2016.
Feltes, C. et al., "Fault Ride-Through of DFIG-based Wind Farms connected to the Grid through VSC-based HVDC Link", 16th PSCC, Glasgow, Scotland, Jul. 14-18, 2008, 7 pages.
Office Action dated Sep. 29, 2020, in corresponding European Application No. 16894508.7, 6 pages.

* cited by examiner

US 10,931,113 B2

POWER CONVERSION DEVICE AND POWER SYSTEM PERFORMING PROTECTION CONTROL FOR SUPPRESSING RECEIVED POWER

TECHNICAL FIELD

The present invention relates to a power conversion device connected between an electric generation grid and a demand area grid and performing power conversion, and a power system including the power conversion device, and in particular, relates to the ones having an operation continuation function in the case of disturbance in a demand area grid.

BACKGROUND ART

For many of grids over long power transmission distances, high voltage direct current (HVDC) power transmission systems are used. This HVDC power transmission system converts power from an AC grid to high-voltage DC power by a power conversion device including a rectifier, and transmits the DC power to a DC grid bus such as a long-distance cable. Then, the DC power is converted to AC power again by a power conversion device including an inverter, and the AC power is transmitted to another AC grid.

In recent years, many of electric generation systems provided distant from urban areas which are power demand areas are interconnected via the above HVDC power transmission systems to the demand area grids. Normally, facilities interconnected to demand area grids are, in many cases, required to satisfy fault ride through (FRT) requirements in which, even when grid disturbance such as instantaneous voltage reduction occurs in a demand area grid due to demand area grid fault or the like, operation continuation control is performed in accordance with the degree of the disturbance. Therefore, in the case where an electric generation system is interconnected to a demand area grid via the HVDC power transmission system, the HVDC power transmission system needs to perform such operation continuation control that the entire power system including the HVDC power transmission system and the electric generation system satisfies FRT requirements.

In order to satisfy such FRT requirements, according to Non-Patent Document 1, when voltage reduction occurs in a demand area grid, a control device of an inverter calculates power that can be outputted to the demand area grid, and this information is transmitted through a communication line to a control device of a power conversion device including a rectifier. Then, the power conversion device executes a protection operation of reducing AC voltage of an AC-side terminal of the rectifier on the basis of the information. A power conditioner in an electric generation system suppresses output power of the electric generation system in accordance with the reduction of AC voltage of the AC-side terminal of the rectifier. Thus, the power conversion device suppresses generated power of the electric generation system in accordance with power that can be supplied to the demand area grid, and keeps power balance in the entire power system including the electric generation system.

According to Patent Document 1, when having detected that DC voltage of a DC grid bus increases beyond a threshold value, a control device of a power conversion device including a rectifier executes a protection operation of reducing AC voltage of an AC-side terminal of the rectifier. Thus, the power conversion device suppresses generated power of an electric generation system in accordance with power that can be supplied to a demand area grid, and keeps power balance in the entire power system including the electric generation system.

CITATION LIST

Patent Document

Patent Document 1: US Patent Application Publication No. US2012/0300510A1 (paragraphs [0055]-[0084], FIG. 1)

Non-Patent Document

Non-Patent Document 1: C. Feltes, H. Wrede, F. Koch, I. Erlich, Fault Ride-Through of DFIG-based Wind Farms connected to the Grid through VSC-based HVDC Link, 16th PSCC, 2008

SUMMARY OF THE INVENTION

Problems to be Solved by the Invention

In the conventional power conversion device and power system as shown in Non-Patent Document 1, a long-distance communication line is needed in order that the control device of the inverter connected to the demand area grid transmits information about power that can be outputted to the demand area grid, to the control device of the power conversion device including the rectifier. Therefore, there is a problem that a space for providing a communication line is needed and the cost increases accordingly.

In the power conversion device and power system described in Patent Document 1, the control device of the power conversion device including the rectifier executes the protection operation by detecting that DC voltage of the DC grid bus exceeds the threshold value. In this case, if the rated DC voltage in normal operation of the power conversion device is close to the threshold value, the protection operation is activated with high frequency due to fluctuation of control. Therefore, it is necessary to provide a sufficient design margin between the threshold value and the rated DC voltage in normal operation of the power conversion device.

Further, the threshold value needs to be smaller than the overvoltage level of a converter and the dielectric voltage of a cable or the like used for the DC grid bus. Therefore, it is necessary to provide a larger design margin than in normal case, between the rated voltage in normal operation, and the overvoltage level of the converter and the dielectric voltage of the cable. Thus, there is a problem that the designing is severely constrained and it becomes difficult to design the power conversion device and the power system.

The present invention has been made to solve the above problems, and an object of the present invention is to provide a power conversion device and a power system that, without the need of a long-distance communication line, enable protection control of the power conversion device to be started before DC bus voltage reaches threshold abnormality and enable improvement in the degree of freedom in voltage designing with respect to DC bus voltage.

Solution to the Problems

A power conversion device according to the present invention includes: a power converter which is connected to an electric generation grid and which converts AC power received from the electric generation grid to DC power and transmits the DC power via DC bus; and a control device for controlling the power converter, wherein the control device includes a detection unit for detecting DC current of the DC bus, and a protection control unit for performing protection control for suppressing an amount of power received from the electric generation grid, on the basis of variation in the DC current.

A power system according to the present invention includes: the power conversion device configured as described above; an inverse power converter which converts DC power from the power converter to AC power and transmits the AC power to a demand area grid; and a control device for controlling the inverse power converter, wherein the control device for the inverse power converter includes a DC voltage control unit for causing DC voltage of the inverse power converter to follow a DC voltage command, and an AC current control unit for causing AC current of the inverse power converter to follow an AC current command, and the control device for the inverse power converter generates an output voltage command for the inverse power converter on the basis of output of the DC voltage control unit and output of the AC current control unit.

Effect of the Invention

In the power conversion device and the power system according to the present invention, protection control for suppressing the amount of power received from the electric generation grid is performed on the basis of variation in DC current of the DC bus, and therefore the protection control of the power conversion device can be started before the DC bus voltage reaches threshold abnormality. Therefore, it is possible to provide a power conversion device and a power system that have an improved degree of freedom in voltage designing with respect to DC bus voltage and have high performance while achieving space saving and cost reduction.

DESCRIPTION OF EMBODIMENTS

Embodiment 1

Hereinafter, a power conversion device and a power system according to embodiment 1 of the present invention will be described with reference to the drawings.

Figure 1:
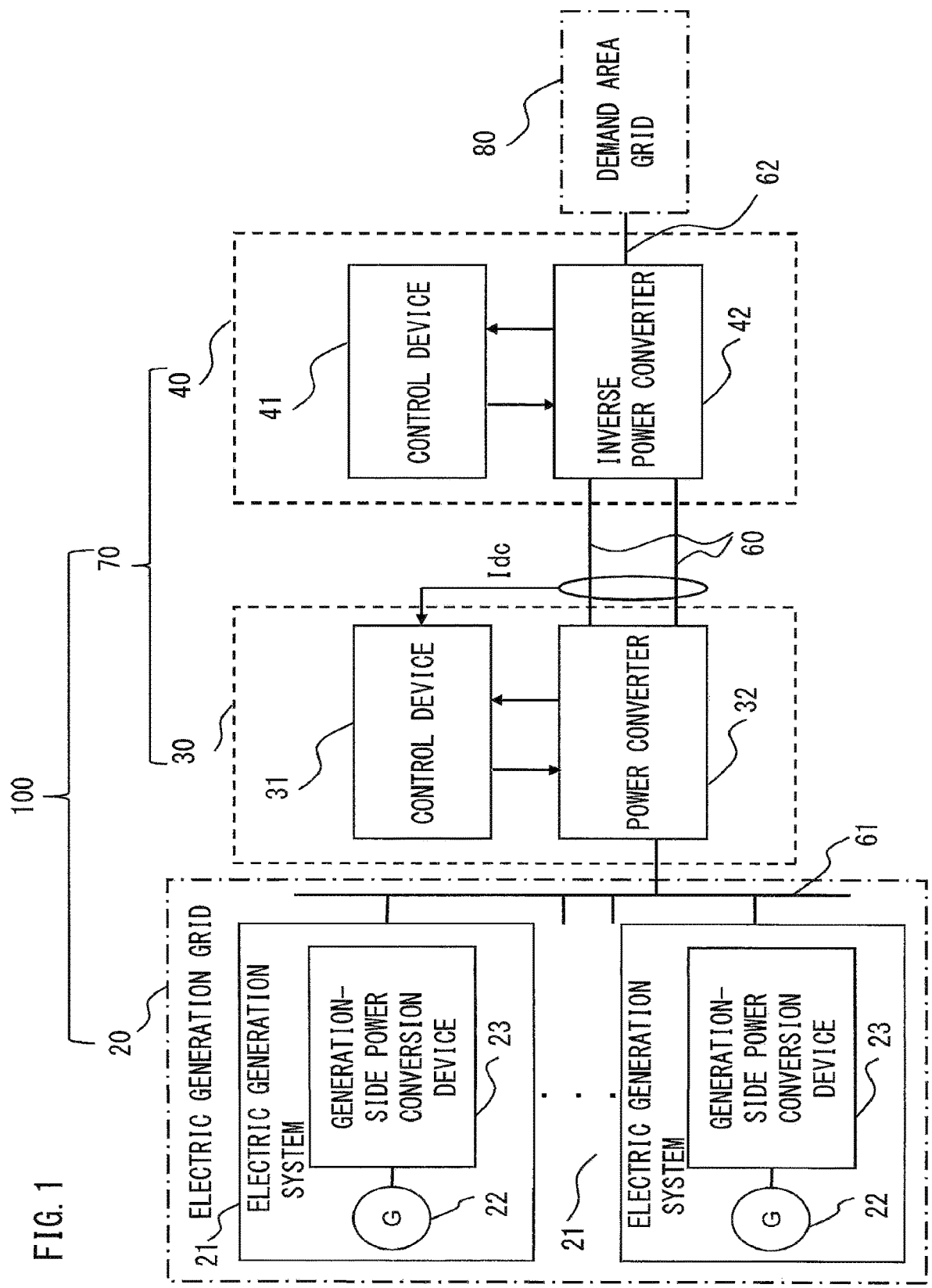
FIG. 1 is a schematic configuration diagram showing the configuration of a power conversion device and a power system according to embodiment 1 of the present invention.

FIG. 1 is a schematic configuration diagram showing the configuration of a power conversion device 30 and a power system 100 according to embodiment 1 of the present invention.

As shown in FIG. 1, the power system 100 of the present embodiment includes an electric generation grid 20, and an HVDC power transmission system 70 (hereinafter, referred to as power transmission system 70) which is connected between the electric generation grid 20 and a demand area grid 80 and supplies generated power from the electric generation grid 20 to the demand area grid 80. The power transmission system 70 includes a power conversion device 30 for converting AC power to DC power, a power conversion device 40 for converting DC power to AC power, and DC grid bus 60 as DC bus such as a long-distance cable for transmitting DC output power from the power conversion device 30 to the power conversion device 40.

The electric generation grid 20 includes at least one electric generation system 21 connected to an electric generation grid bus 61. Each electric generation system 21 includes at least one electric generation device 22, and a generation-side power conversion device 23 for adjusting voltage and current of power generated by the electric generation device 22. As the electric generation device 22, any type of electric generation device may be used. For example, in the case where the electric generation device 22 is a wind power generation facility or the like that outputs AC power, the generation-side power conversion device 23 performs conversion between AC power and AC power. For example, in the case where the electric generation device 22 is a photovoltaic generation facility or the like that outputs DC power, the generation-side power conversion device 23 performs conversion between DC power and AC power.

Thus, each electric generation system 21 is configured to supply AC power to the power conversion device 30 via the electric generation grid bus 61.

For the configuration of the electric generation grid bus 61, any type such as tree type, star type, or ring type may be adopted, and the present invention is not limited by the configuration of the electric generation grid bus 61.

The power conversion device 30 which receives AC power from the electric generation grid 20 includes a power converter 32 as a main circuit, and a control device 31 for controlling the power converter 32. The power converter 32 performs conversion between multi-phase AC power, here, three-phase AC power, and DC power, and has AC-side terminals connected to the electric generation grid bus 61, and DC-side terminals connected to the DC grid bus 60. Thus, the AC power received from the electric generation grid 20 is converted to DC power and the DC power is transmitted to the DC grid bus 60.

The power conversion device 40 which receives DC power from the power conversion device 30 includes an inverse power converter 42 as a main circuit, and a control device 41 for controlling the inverse power converter 42. Similarly to the power converter 32, the inverse power converter 42 performs conversion between multi-phase AC power, here, three-phase AC power, and DC power. The inverse power converter 42 has DC-side terminals connected to the DC grid bus 60, and AC-side terminals connected to a demand area grid bus 62. Thus, the DC power received from the power converter 32 is converted to AC power and the AC power is supplied to the demand area grid 80 via the demand area grid bus 62.

Figure 2:
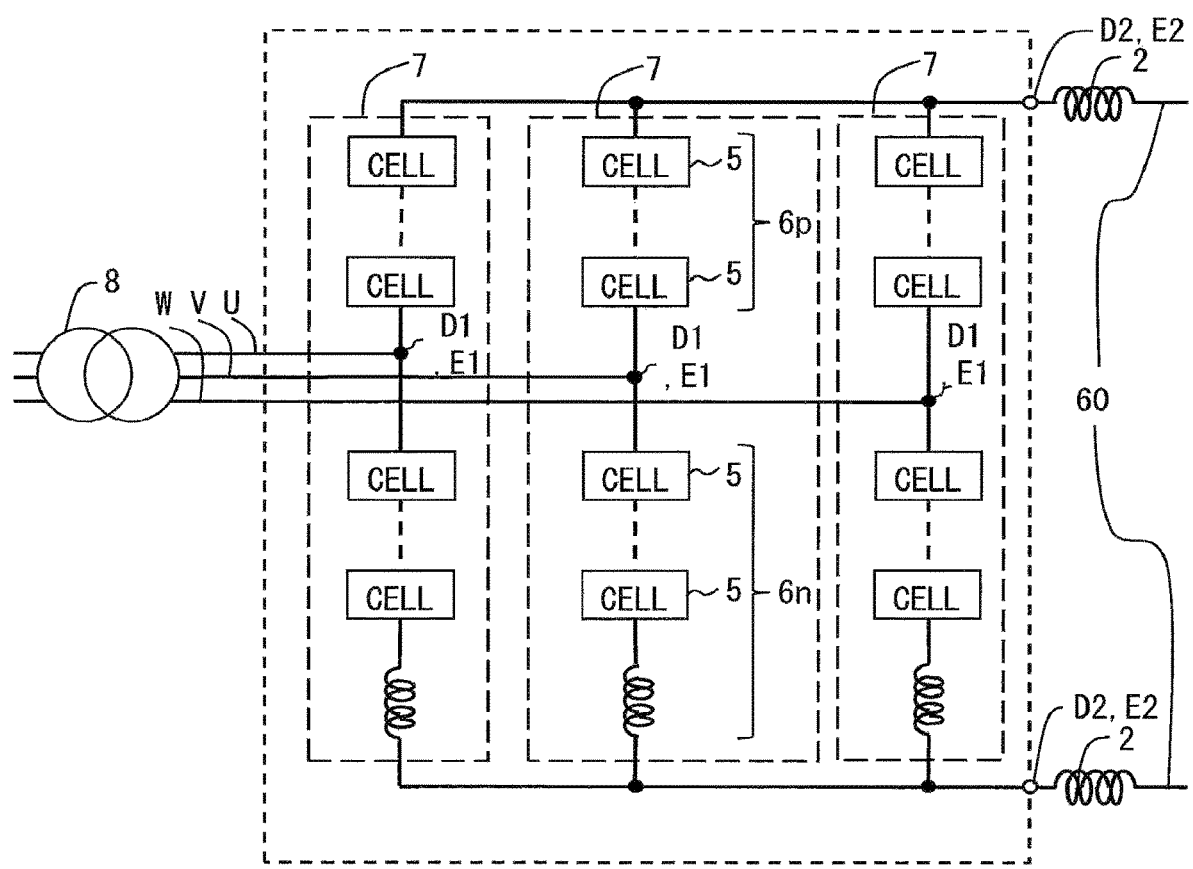
FIG. 2 is a circuit configuration example of a power converter according to embodiment 1 of the present invention.

FIG. 2 is a circuit configuration example of the power converter 32 and the inverse power converter 42 according to embodiment 1 of the present invention.

Figure 3A:
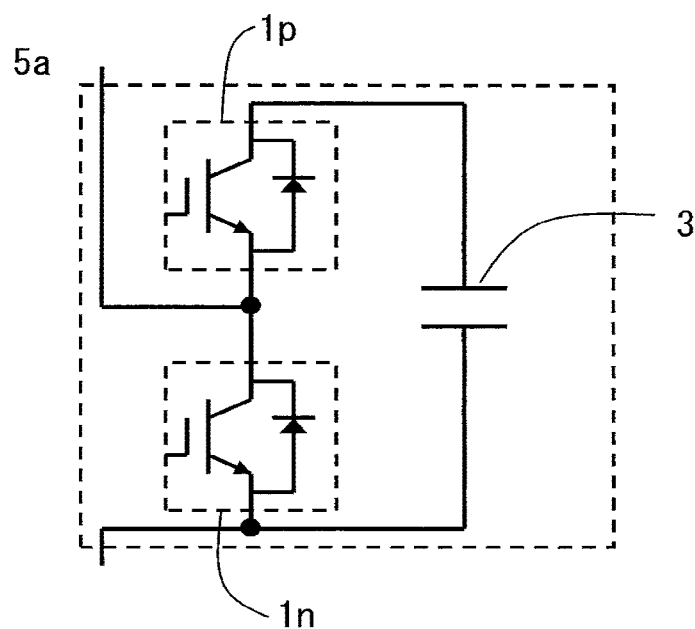
FIGS. 3A and 3B are circuit configuration examples of a unit converter cell composing the power converter according to embodiment 1 of the present invention.
Figure 3B:
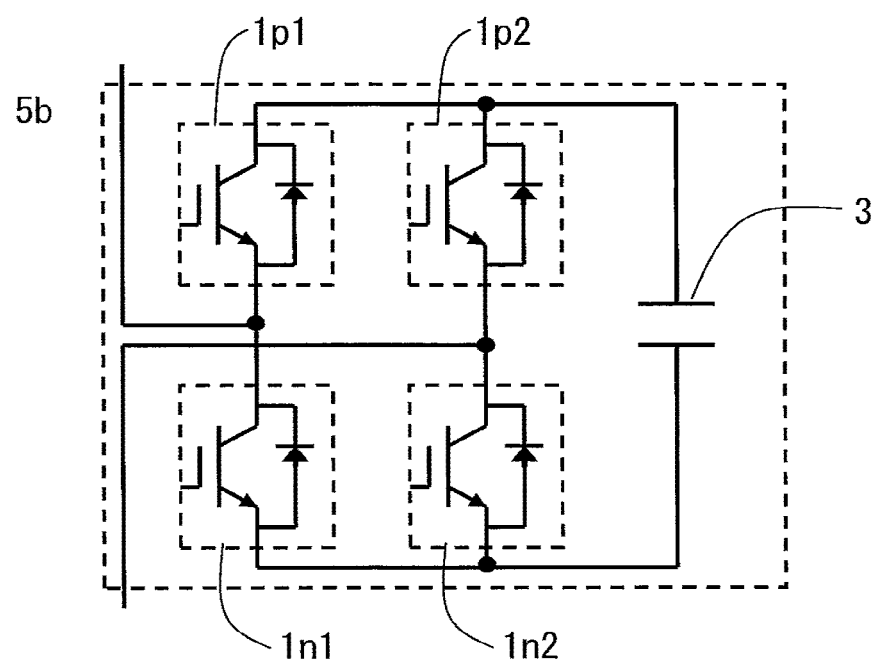

FIG. 3A and FIG. 3B are circuit configuration examples of unit converter cells 5 composing the power converter 32 and the inverse power converter 42 according to embodiment 1 of the present invention.

Figure 4A:
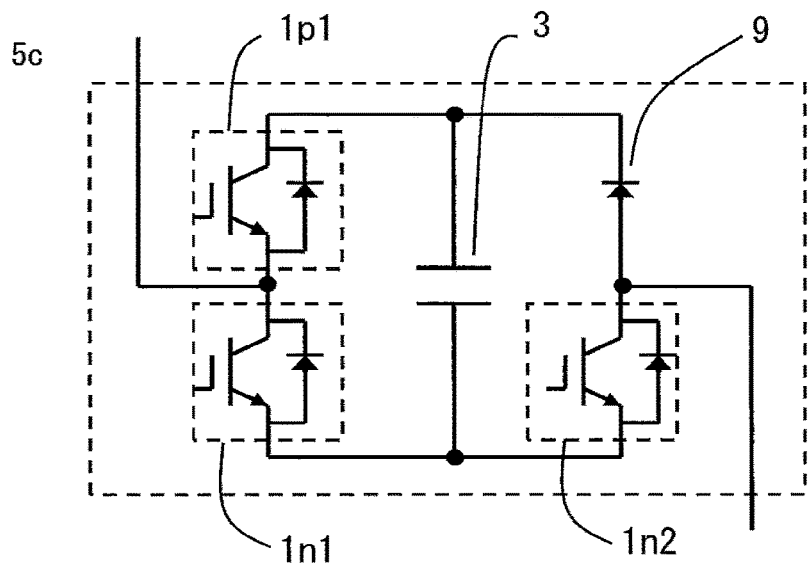
FIGS. 4A and 4B are circuit configuration examples of a unit converter cell composing the power converter according to embodiment 1 of the present invention.
Figure 4B:
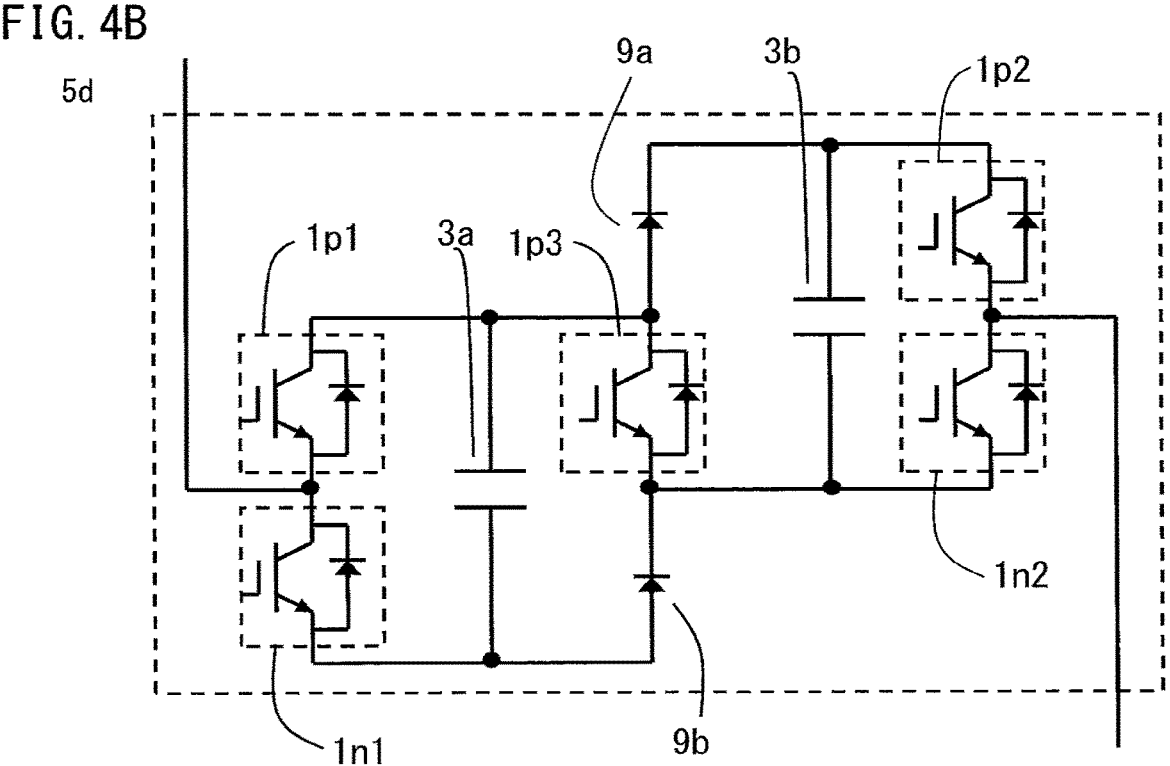

FIG. 4A and FIG. 4B are circuit configuration examples of unit converter cells 5 composing the power converter 32 and the inverse power converter 42 according to embodiment 1 of the present invention.

As shown in FIG. 2, for the power converter 32 and the inverse power converter 42, a converter called a modular multilevel converter is used which has, for each phase, a plurality of unit converter cells 5 connected in series.

The power converter 32 and the inverse power converter 42 are each composed of leg circuits 7 for respective phases, each of which has a positive arm 6p and a negative arm 6n connected in series, and an AC-side terminal D1 which is the connection point therebetween is connected to the corresponding one of respective phase AC lines U, V, W. Each of the positive arm 6p and the negative arm 6n of each leg circuit 7 has one or more unit converter cells 5 connected in series. The leg circuits 7 for the respective phases are connected in parallel between positive and negative DC bus.

It is noted that, in the power converter 32 shown in FIG. 1, the left side in the drawing is the AC-side terminals D1 and the right side in the drawing is the DC-side terminals D2. These correspond to the left side and the right side of the power converter 32 shown in FIG. 2.

On the other hand, in the inverse power converter 42 shown in FIG. 1, the left side in the drawing is DC-side terminals E2 and the right side in the drawing is AC-side terminals E1. These are reverse to the left side and the right side of the inverse power converter 42 shown in FIG. 2, but such illustration is for convenience sake.

Between the AC-side terminals D1 of the power converter 32 and the electric generation grid 20, a transformer 8 for interconnection may be provided, or a reactor (not shown) for interconnection may be provided instead of the transformer 8. Similarly, between the AC-side terminals E1 of the inverse power converter 42 and the demand area grid 80, a transformer 8 for interconnection may be provided, or a reactor (not shown) for interconnection may be provided instead of the transformer 8.

Between the DC-side terminals D2 of the power converter 32 and the DC grid bus 60, reactors 2 for interconnection may be provided, and similarly, between the DC-side terminals E2 of the inverse power converter 42 and the DC grid bus 60, reactors 2 for interconnection may be provided.

The configuration is not limited to the above configuration in which the AC-side terminal D1 (E1) which is the connection point between the positive arm 6p and the negative arm 6n is connected to each phase AC line U, V, W. For example, the positive arm 6p and the negative arm 6n may be connected in series and then connected via a transformer to each phase AC line U, V, W.

Next, four circuit configuration examples (unit converter cells 5a, 5b, 5c, 5d) of the unit converter cells 5 shown in FIG. 3A, FIG. 3B, FIG. 4A, and FIG. 4B will be described.

The unit converter cell 5a shown in FIG. 3A has a circuit configuration called half-bridge configuration. In this configuration, a capacitor 3 is connected in parallel to a series body composed of semiconductor switching elements 1p, 1n as two semiconductor elements connected in series.

Both terminals of the semiconductor switching element 1n or both terminals of the semiconductor switching element 1p are used as input/output terminals, and voltage between both ends of the capacitor 3 and zero voltage are outputted through switching operations of the semiconductor switching elements 1p, 1n.

The unit converter cell 5b shown in FIG. 3B has a circuit configuration called full-bridge configuration. This configuration has a series body composed of semiconductor switching elements 1p1, 1n1 as two semiconductor elements connected in series, and a series body composed of semiconductor switching elements 1p2, 1n2 as two semiconductor elements connected in series. These two series bodies and a capacitor 3 are connected in parallel.

The middle point between the semiconductor switching element 1p1 and the semiconductor switching element 1n1, and the middle point between the semiconductor switching element 1p2 and the semiconductor switching element 1n2, are used as input/output terminals of the unit converter cell 5. Voltage between both ends of the capacitor 3, reverse voltage of the voltage between both ends of the capacitor 3, and zero voltage are outputted through switching operations of the semiconductor switching elements 1p1, 1n1, 1p2, 1n2.

The unit converter cell 5c shown in FIG. 4A has a circuit configuration obtained by replacing the semiconductor switching element 1p2 of the unit converter cell 5b shown in FIG. 3B with a diode 9 as a semiconductor element. Voltage between both ends of the capacitor 3 and zero voltage are outputted through switching operations of the semiconductor switching elements 1p1, 1n1. However, only when current passing through the unit converter cell 5c flows from the lower side to the upper side and the semiconductor switching elements 1p1, 1n2 are OFF, reverse voltage of the voltage between both ends of the capacitor 3 is outputted.

The unit converter cell 5d shown in FIG. 4B has a circuit configuration called clamped double cell or double clamp cell. In this configuration, a circuit having a configuration as shown in FIG. 4A is formed using semiconductor switching elements 1p2, 1n2, a semiconductor switching element 1p3 as a semiconductor element, a capacitor 3b, and a diode 9a as a semiconductor element. Further, a circuit having a half-bridge configuration is formed using semiconductor switching elements 1p1, 1n1 and a capacitor 3a, and the connection point between the capacitor 3a and the semiconductor switching element 1p1 is connected to the connection point between the semiconductor switching element 1p3 and the diode 9a. Furthermore, the connection point between the capacitor 3a and the semiconductor switching element 1n1 is connected via a diode 9b as a semiconductor element to the connection point between the semiconductor switching element 1p3 and the capacitor 3b.

The middle point between the semiconductor switching element 1p1 and the semiconductor switching element 1n1, and the middle point between the semiconductor switching element 1p2 and the semiconductor switching element 1n2, are used as input/output terminals of the unit converter cell 5d. Voltage between both ends of the capacitor 3a or the capacitor 3b, reverse voltage of the voltage between both ends thereof, and zero voltage are outputted through switching operations of the semiconductor switching elements 1p1, 1n1, 1p2, 1n2, 1p3. However, only when current passing through the cell flows from the lower side to the upper side and the semiconductor switching elements 1p1, 1n2 are OFF, the sum of voltage between both ends of the capacitor 3a and voltage between both ends of the capacitor 3b is outputted as reverse voltage.

The semiconductor switching elements 1p, 1n, 1p1, 1n1, 1p2, 1n2, 1p3 are each configured by connecting a FWD (Freewheeling Diode) in antiparallel to a self-turn-off switching element such as an IGBT (Insulated Gate Bipolar Transistor) or a GCT (Gate Commutated Turn-off) thyristor.

As the unit converter cells 5 composing the power converter 32 and the inverse power converter 42, any of the unit converter cells 5a, 5b, 5c, 5d shown in FIG. 3A, FIG. 3B, FIG. 4A and FIG. 4B may be used.

Figure 5:
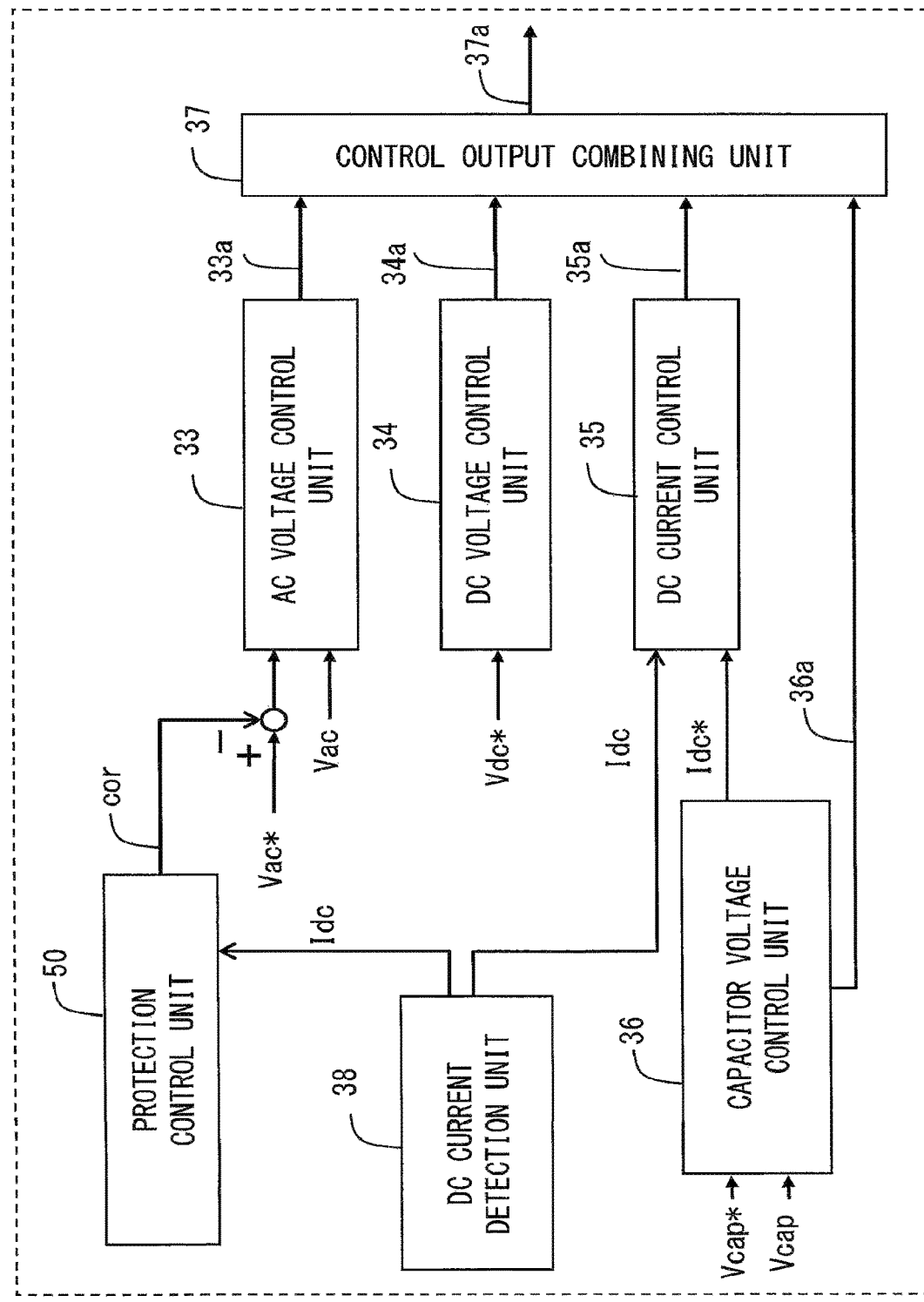
FIG. 5 is a block diagram showing the configuration of a control device for the power converter according to embodiment 1 of the present invention.

FIG. 5 is a block diagram showing the configuration of the control device 31 for the power converter 32 according to embodiment 1 of the present invention.

Figure 6:
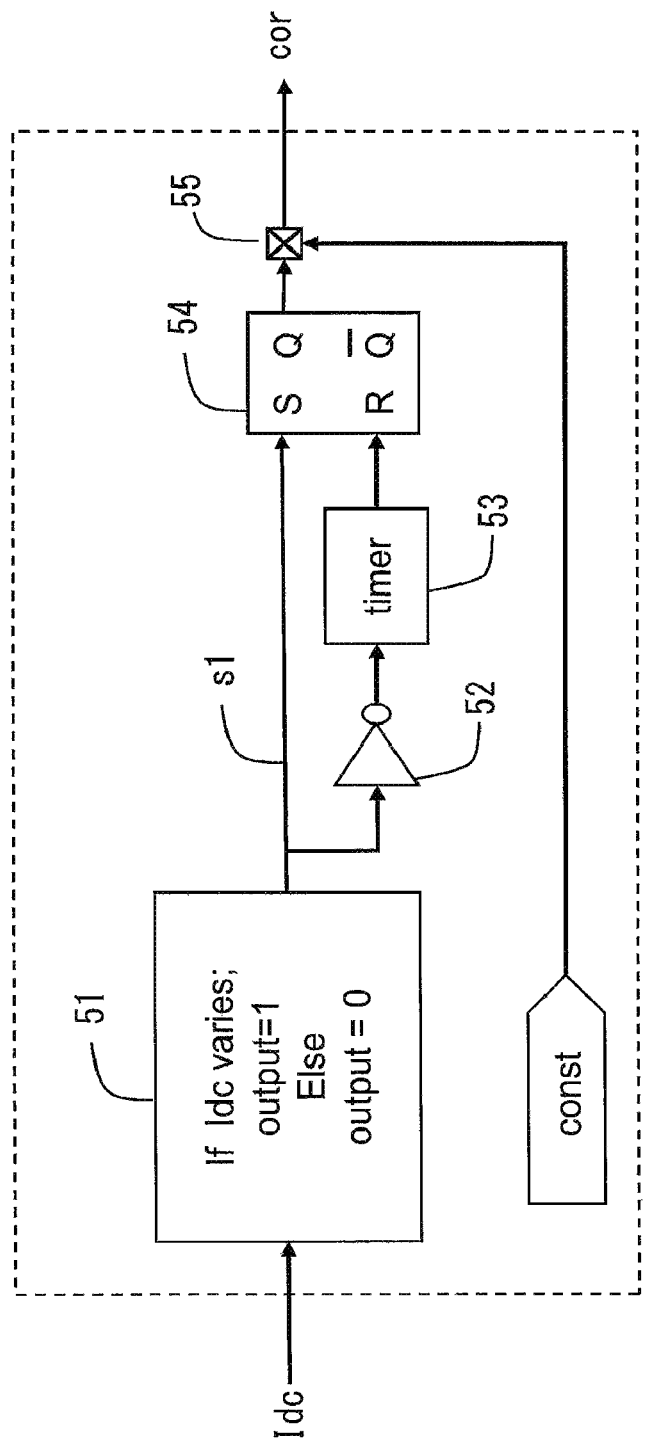
FIG. 6 is a block diagram showing the configuration of a protection control unit in the control device for the power converter according to embodiment 1 of the present invention.

FIG. 6 is a block diagram showing the configuration of a protection control unit 50 of the control device 31 shown in FIG. 5.

Figure 7:
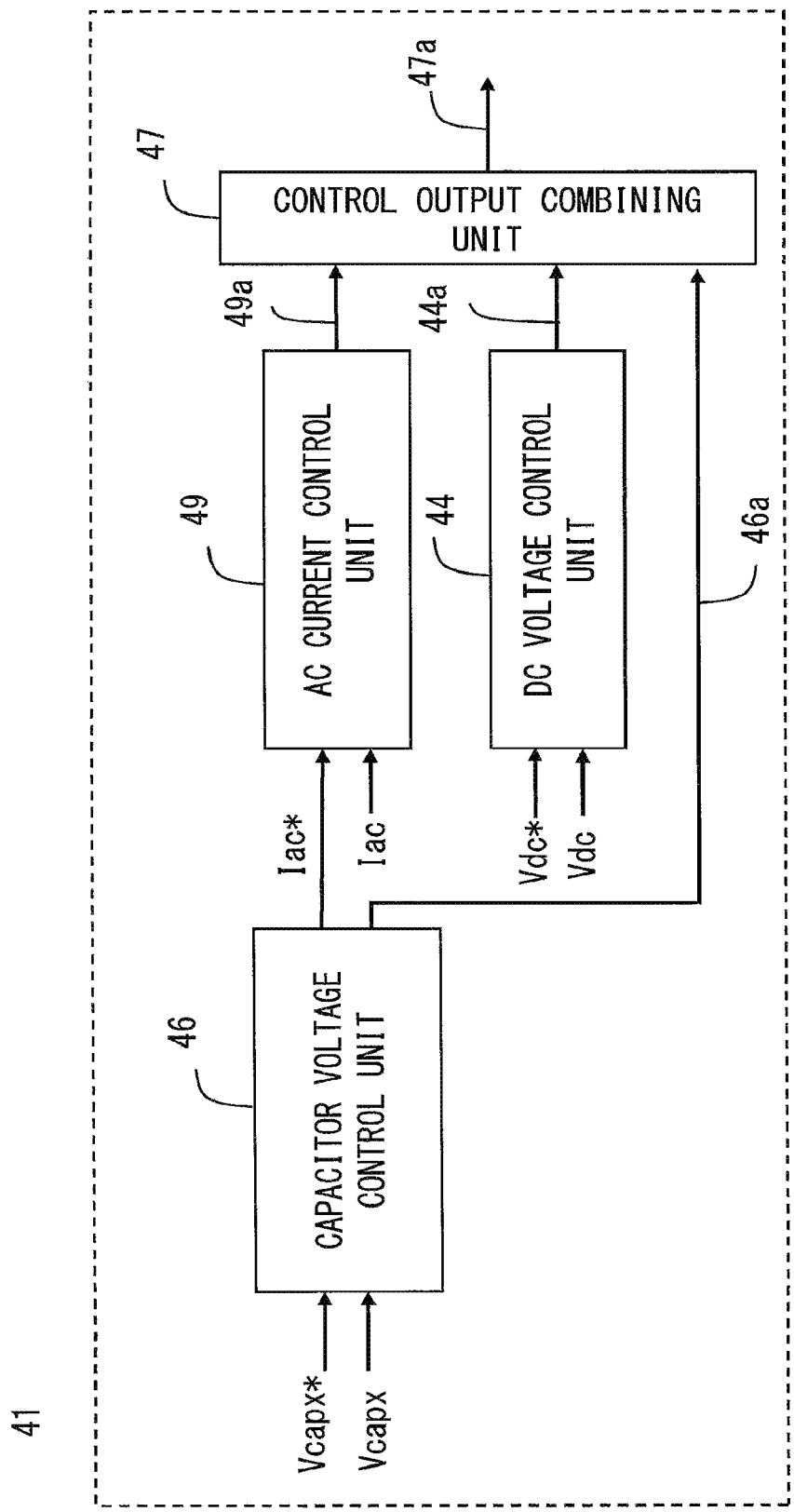
FIG. 7 is a block diagram showing the configuration of a control device for an inverse power converter according to embodiment 1 of the present invention.

FIG. 7 is a block diagram showing the configuration of the control device 41 for the inverse power converter 42 according to embodiment 1 of the present invention.

Of the two power conversion devices 30, 40, first, the configuration of the control device 31 of the power conversion device 30 connected on the electric generation grid 20 side, i.e., the control device 31 for the power converter 32 will be described.

As shown in FIG. 5, the control device 31 includes a capacitor voltage control unit 36, an AC voltage control unit 33, a DC voltage control unit 34, a DC current control unit 35, a control output combining unit 37, a DC current detection unit 38 as a detection unit for detecting DC current Idc, and the protection control unit 50. Hereinafter, the details of each unit will be described.

The DC current detection unit 38 detects DC current Idc outputted from the power converter 32 and flowing through the DC grid bus 60.

The AC voltage control unit 33 performs control calculation so that AC voltage Vac at the power reception end (AC-side terminals D1) of the power converter 32 follows an AC voltage command Vac* having an amplitude and a frequency that are constant, thereby generating and outputting an AC control command 33a.

The capacitor voltage control unit 36 performs control calculation so that voltage Vcap of each capacitor 3 in the power converter 32 follows a capacitor voltage command Vcap*, thereby generating and outputting a voltage balance control command 36a and a DC current command Idc*. It is noted that the capacitor voltage control unit 36 generates the DC current command Idc* for DC current Idc to be outputted, on the basis of voltage Vcap of the capacitor 3 in the power converter 32 which varies depending on received power and output power.

The DC current control unit 35 performs control calculation so that DC current Idc detected by the DC current detection unit 38 follows a DC current command Idc*, thereby generating and outputting a DC control command 35a.

The DC voltage control unit 34 generates and outputs a DC control command 34a on the basis of a DC voltage command Vdc* for causing DC voltage at the DC-side terminals D2 of the power converter 32 to be constant. The DC voltage at the DC-side terminals D2 of the power converter 32 is adjusted by the above DC control command 34a and DC control command 35a. The DC voltage at the DC-side terminals D2 is adjusted in consideration of voltage drop when DC current Idc flows through the DC grid bus 60.

The control output combining unit 37 combines the AC control command 33a, the DC control command 34a, the DC control command 35a, and the voltage balance control command 36a, to generate an output voltage command 37a for controlling the power converter 32. On the basis of the output voltage command 37a, gate signals for controlling the unit converter cells 5 for each phase of the power converter 32 are generated by a gate signal generation circuit (not shown), here, a PWM circuit, for example.

Thus, the control device 31 controls the power converter 32 by the generated output voltage command 37a so that AC voltage Vac at the AC-side terminals D1 has a constant amplitude and a constant frequency, and so as to adjust DC current Idc to be outputted to the DC-side terminals D2 on the basis of power received from the AC-side terminals D1.

As shown in FIG. 6, the protection control unit 50 of the control device 31 includes: a determination unit 51 for detecting variation in DC current Idc of the DC grid bus 60; an inverter 52; a delay device 53 which is an ON delay timer;

a flip-flop circuit 54 having a reset input terminal R, a set input terminal S, and an output terminal Q; and a multiplier 55.

When having detected that DC current Idc varies beyond a predetermined range, the determination unit 51 outputs "1" as determination information s1. The determination information s1 is inputted to the set input terminal S of the flip-flop circuit 54, and then, after outputted, is multiplied by a predetermined constant const by the multiplier 55, and the resultant value is outputted as correction information cor from the protection control unit 50. The correction information cor is to be subtracted from the AC voltage command Vac* to be inputted to the AC voltage control unit 33.

When having detected that variation in the DC current Idc returns into the predetermined range, the determination unit 51 outputs "0" as determination information s1. After the determination information s1 is inverted by the inverter 52, the determination information s1 is delayed by a predetermined period by the delay device 53 and inputted to the reset input terminal R of the flip-flop circuit 54. Thus, when the predetermined period has elapsed since the detection that variation in DC current Idc returned into the predetermined range, the protection control unit 50 nullifies the correction information cor as "0".

As a method for the determination unit 51 to detect variation in DC current Idc beyond the predetermined range as described above, there is a method of detecting the amount of variation in DC current Idc, for example. In this case, when variation in DC current Idc occurs beyond a current variation range in normal operation, the determination unit 51 may perform the detection. Alternatively, for example, the variation speed at which DC current Idc varies may be detected. In this case, there is a method of detecting a differential coefficient of a tangent on the current waveform of DC current Idc, for example.

Next, the configuration of the control device 41 of the power conversion device 40 connected on the demand area grid 80 side, i.e., the control device 41 for the inverse power converter 42 will be described.

As shown in FIG. 7, the control device 41 includes a capacitor voltage control unit 46, an AC current control unit 49, a DC voltage control unit 44, and a control output combining unit 47.

The DC voltage control unit 44 performs control calculation so that DC voltage Vdc at the DC-side terminals E2 of the inverse power converter 42 follows the DC voltage command Vdc* having constant voltage, thereby generating and outputting a DC control command 44a.

The capacitor voltage control unit 46 performs control calculation so that voltage Vcapx of each capacitor 3 in the inverse power converter 42 follows a capacitor voltage command Vcapx*, thereby generating and outputting a voltage balance control command 46a and an AC current command Iac*. It is noted that the capacitor voltage control unit 46 generates the AC current command Iac* for AC current Iac to be outputted, on the basis of voltage Vcapx of the capacitor 3 in the inverse power converter 42 that varies depending on received power and output power.

The AC current control unit 49 performs control calculation so that AC current Iac outputted from the inverse power converter 42 follows the AC current command Iac*, thereby generating and outputting an AC control command 49a.

The control output combining unit 47 combines an AC control command 49a, a DC control command 44a, and a voltage balance control command 46a, thereby generating an output voltage command 47a for controlling the inverse power converter 42. On the basis of the output voltage command 47a, gate signals for controlling the unit converter cells 5 for each phase of the inverse power converter 42 are generated by a gate signal generation circuit (not shown), here, a PWM circuit, for example.

Thus, the control device 41 controls the inverse power converter 42 by the generated output voltage command 47a so that DC voltage Vdc at the DC-side terminals E2 becomes constant voltage, and so as to adjust AC current Iac to be outputted to the AC-side terminals E1 on the basis of power received from the DC-side terminals E2.

Hereinafter, an operation continuation function in the power conversion device 30, the power transmission system 70, and the power system 100 according to the present embodiment 1 in the case of grid disturbance in the demand area grid 80 will be described.

When grid disturbance occurs in the demand area grid 80, AC voltage at the AC-side terminals E1 of the inverse power converter 42 reduces, and AC power that the inverse power converter 42 can output to the demand area grid 80 decreases. As a result, DC power flowing into the inverse power converter 42 decreases, so that DC current Idc decreases.

As described above, the determination unit 51 of the protection control unit 50 included in the power conversion device 30 detects variation in DC current Idc beyond the predetermined range. In this case, the protection control unit 50 detects decrease in DC current Idc of the power converter 32 beyond the predetermined range, and outputs the correction information cor as a correction amount. The outputted correction information cor is subtracted from the AC voltage command Vac* to be inputted to the AC voltage control unit 33. Thus, on the basis of the AC voltage command Vac* from which the correction information cor has been subtracted, the amplitude of AC voltage Vac at the AC-side terminals D1 of the power converter 32 decreases.

As described above, the power conversion device 30 subtracts the correction information cor from the AC voltage command Vac*, to decrease the amplitude of AC voltage Vac at the AC-side terminals D1 of the power converter 32, thus performing protection control of suppressing the amount of power received from the electric generation grid 20.

The generation-side power conversion device 23 of the electric generation system 21 has an FRT function with respect to voltage reduction of the electric generation grid bus 61 connected thereto. Therefore, when AC voltage on the output side of the generation-side power conversion device 23 reduces in accordance with decrease in the amplitude of AC voltage at the AC-side terminals D1 of the power conversion device 30 due to the protection control, the FRT function is actuated and the generation-side power conversion device 23 continues operation while suppressing output power.

In this way, output power of the electric generation grid 20 is suppressed in accordance with decrease in output power of the power conversion device 40 due to grid disturbance in the demand area grid 80. Thus, even in the case of grid disturbance, supply of power to the demand area grid 80 is continued while power balance in the power transmission system 70 and the power system 100 is kept.

As described above, in the case where variation in DC current Idc has returned into the predetermined range, the protection control unit 50 nullifies the correction information cor after the predetermined period has elapsed, whereby the protection control is stopped. Thus, suppression of generated power in the electric generation grid 20 is cancelled and normal operation is restarted in which power that should be supplied in a normal state is supplied to the demand area grid 80.

According to the power conversion device 30 of the present embodiment configured as described above, the power conversion device 30 connected to the electric generation grid 20 side detects voltage abnormality or the like of another grid interconnected to the output side of the power converter 32, on the basis of variation in DC current Idc outputted from the power converter 32, and performs protection control for suppressing the amount of power received from the electric generation grid 20. Therefore, it is not necessary to receive information for performing the protection control from another electrical facility, and it is possible to perform the protection control by the power conversion device 30 alone. In addition, since delay due to information transmission for performing protection control does not occur, it is possible to start protection control swiftly after detection of voltage abnormality of another grid. Thus, imbalance between received power and output power in the power converter 32 is suppressed and the power converter 32 can be stabilized immediately.

In addition, since only variation in DC current Idc beyond the predetermined range is detected, it is possible to prevent protection control from being performed by erroneous detection of variation in DC current Idc that falls within the rated range of the power conversion device 30.

In the case of abnormality of the output-side grid, the power conversion device 30 detects DC current Idc varying in advance before DC voltage on the output side reaches threshold abnormality. Therefore, it is possible to detect voltage abnormality or the like of the output-side grid while keeping the output-side DC voltage within the rated operation range. Therefore, it is possible to reduce the design margin between the rated operation voltage of the power converter 32 and the overvoltage level of the power converter 32. Thus, it is possible to provide the power conversion device 30 that has decreased constraints in designing and has high performance.

In the case where this power conversion device 30 is interconnected to the demand area grid 80 in an urban area or the like via the DC grid bus 60 and the power conversion device 40 including the inverse power converter 42, detection of grid disturbance due to fault or the like of the demand area grid 80 can be performed on the basis of detection of variation in DC current Idc. Also in this case, it is possible to detect grid disturbance in the demand area grid 80 while keeping voltage of the DC grid bus 60 within the rated operation range. Therefore, it is possible to reduce the design margin between the rated voltage in normal operation, and the overvoltage levels of the power converter 32 and the inverse power converter 42 and the dielectric voltage of the DC grid bus 60. Thus, it is possible to provide the power conversion device 30, the power transmission system 70, and the power system 100 that have decreased constraints in designing and have high performance.

Also in this case, it is not necessary to provide a long-distance communication line between the power conversion device 30 and the power conversion device 40, and thus space saving and cost reduction of the power transmission system 70 and the power system 100 can be achieved. In addition, since delay due to information transmission for starting protection control does not occur, it is possible to suppress generated power of the electric generation grid 20 swiftly after detection of grid disturbance in the demand area grid 80. Thus, it is possible to immediately stabilize power balance in the power transmission system 70 and power balance in the entire power system 100.

In addition, in the case where variation in DC current Idc has returned into the predetermined range, the protection control unit 50 stops protection control after the predetermined period has elapsed. By providing the predetermined period as described above, it is possible to inhibit protection control from being unintentionally and frequently started and stopped, and thus the operations of the power conversion device 30, the power transmission system 70, and the power system 100 can be stabilized.

DC current Idc tends to decrease in the case of grid disturbance. Therefore, even in the case of using variation in DC current Idc for detection of grid disturbance, it is not necessary to increase the DC current withstand capacities of the power converter 32, the inverse power converter 42, the cable used for the DC grid bus 60, and the like.

The DC current Idc which is information used for determination as to grid disturbance by the protection control unit 50 of the power conversion device 30 is information also used for control in normal operation by the power conversion device 30. Therefore, it is not necessary to newly provide a detector for detecting grid disturbance.

The control device 31 decreases the amplitude of AC voltage Vac at the AC-side terminals D1 of the power converter 32*a* by using the correction information cor, thereby suppressing the amount of power received from the electric generation system 21. Thus, it becomes unnecessary to provide a communication line between the power conversion device 30 and the electric generation system 21, whereby further space saving and cost reduction can be achieved.

Figure 8:
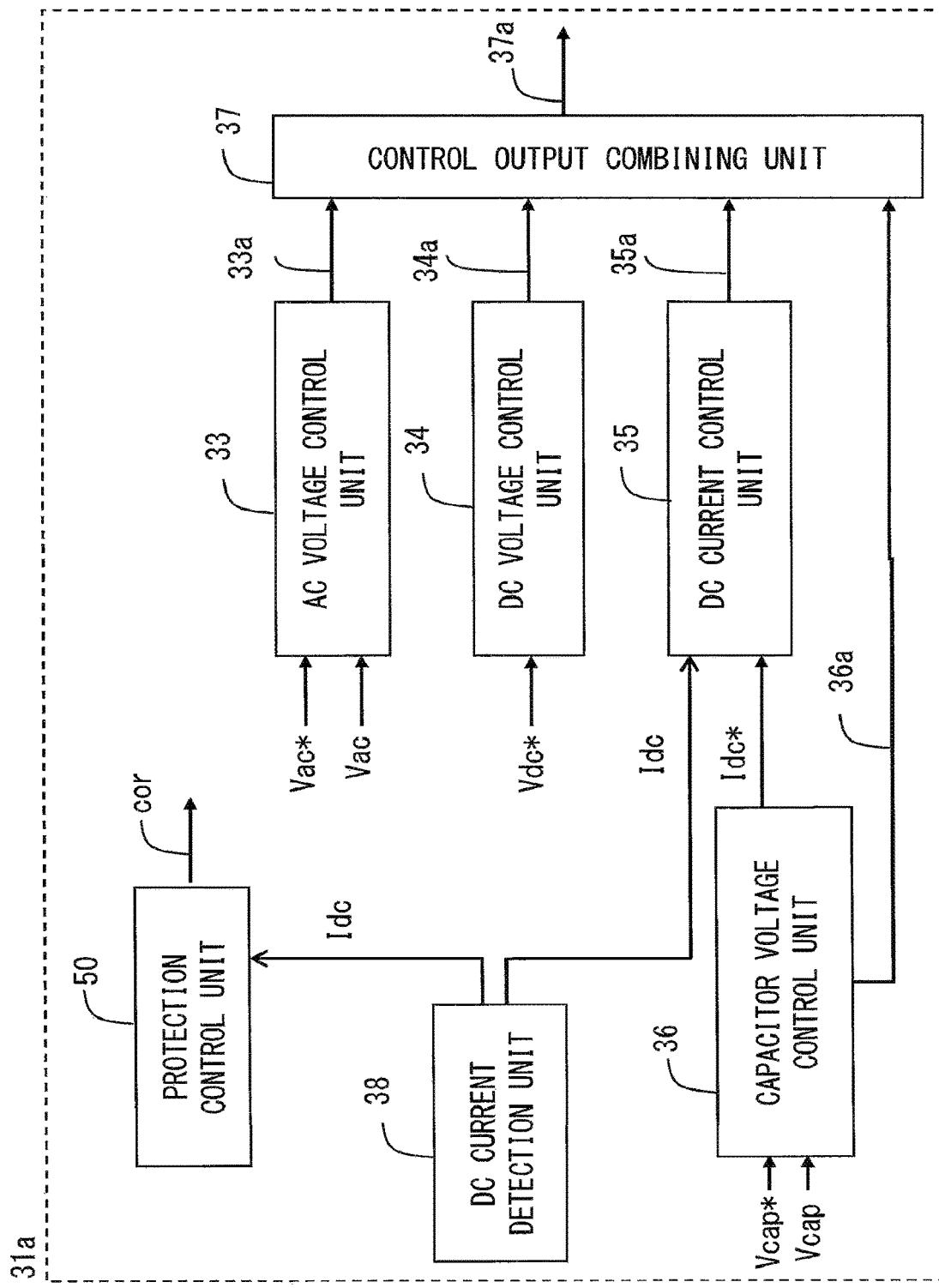
FIG. 8 is a block diagram showing another configuration example of a control device for the power converter according to embodiment 1 of the present invention.

FIG. 8 is a block diagram showing the configuration of a control device 31*a* different from the configuration of the control device 31 shown in FIG. 5.

As in the control device 31 described above, the protection control unit 50 outputs correction information cor when having detected decrease in DC current Idc of the power converter 32. The correction information cor is transmitted to each electric generation system 21 included in the electric generation grid 20.

The generation-side power conversion device 23 in each electric generation system 21 has a FRT function with respect to the protection control by the protection control unit 50. Therefore, when the correction information cor is received from the protection control unit 50, the FRT function is actuated so that the amplitude of power to be outputted is decreased to suppress output power and the operation is continued. In this way, the power conversion device 30 suppresses the amount of power received from the electric generation grid 20, by transmitting the correction information cor to the electric generation system 21.

As described above, the control device 31*a* transmits the correction information cor to the electric generation system 21, and the electric generation system 21 can start control for suppressing output power swiftly when receiving the correction information cor. Thus, it is possible to start control for suppressing generated power swiftly after detection of grid disturbance in the demand area grid 80, thereby immediately stabilizing power balance in the power conversion device 30, the power transmission system 70, and the power system 100.

Figure 9:
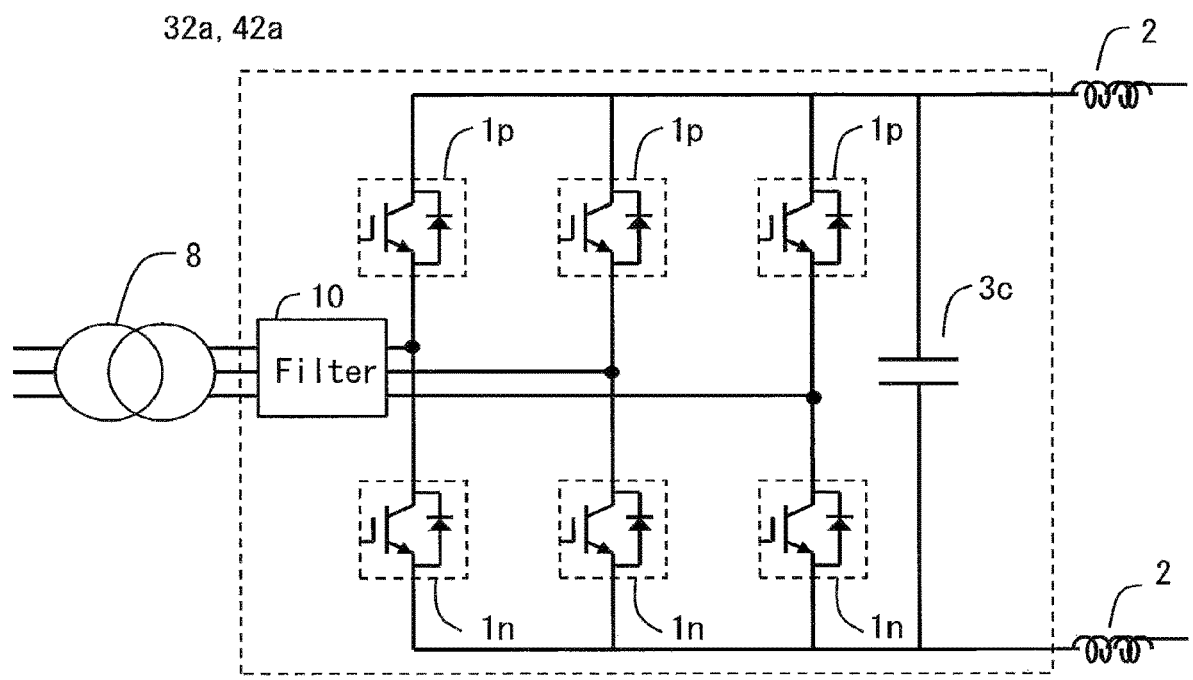
FIG. 9 shows another circuit configuration example of a power converter according to embodiment 1 of the present invention.

FIG. 9 is a circuit configuration example of a power converter 32*a* and an inverse power converter 42*a* different from the configuration of the power converter 32 and the inverse power converter 42 shown in FIG. 2. FIG. 9 shows a power converter 32*a* (inverse power converter 42*a*) having a three-phase configuration in which legs having half-bridge configurations are provided for the respective phases, a capacitor 3c is provided between DC bus, and a low-pass filter circuit 10 for suppressing harmonics is provided on the AC output side.

The power converter 32 and the inverse power converter 42 described above are modular multilevel converters having, for each phase, a plurality of unit converter cells 5 connected in series. However, the power converter 32a and the inverse power converter 42a having a configuration called 2-level converter as shown in FIG. 9 may be used.

In the above description, the power converters 32, 32a and the inverse power converters 42, 42a have a multi-phase configuration. However, without limitation to a multi-phase configuration, a single-phase configuration may be employed.

The power converter 32a and the inverse power converter 42a may be self-excited power converters formed of self-turn-off switching elements such as IGBTs or GCT thyristors as described above, and the circuit configurations shown in FIG. 2, FIG. 3A, FIG. 3B, FIG. 4A, FIG. 4B, and FIG. 9 are not intended to limit the present invention.

The power converter 32, 32a used for the power conversion device 30 and the inverse power converter 42, 42a used for the power conversion device 40 do not necessarily need to have the same circuit configuration. For example, one of the power converter and the inverse power converter may be a modular multilevel converter, and the other one may be a 2-level converter.

The DC current control unit 35 in the control device 31 for the power conversion device 30 may have the following configuration.

Figure 10:
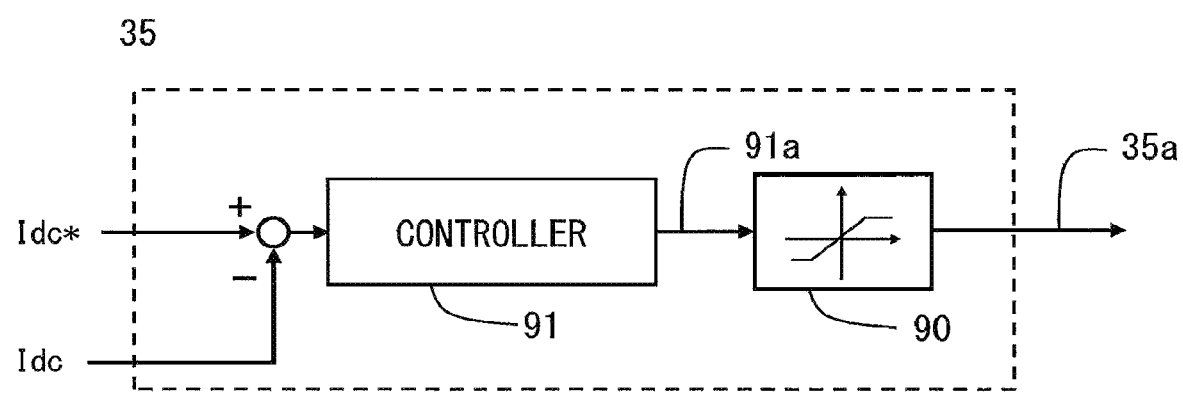
FIG. 10 is a block diagram showing a configuration example of a DC current control unit in the control device for the power converter according to embodiment 1 of the present invention.

FIG. 10 is a block diagram showing a configuration example of the DC current control unit 35 in the control device 31 for the power conversion device 30 according to embodiment 1 of the present invention.

As shown in FIG. 10, the DC current control unit 35 includes: a controller 91 which receives a deviation between the DC current command Idc* and DC current Idc and calculates a control amount; and an output limiter 90 for limiting output 91a of the DC current control unit 35 by a predetermined limit value.

As described above, DC voltage at the DC-side terminals D2 of the power conversion device 30 is adjusted by the DC control command 34a outputted from the DC voltage control unit 34 and the DC control command 35a outputted from the DC current control unit 35 in the control device 31. Therefore, by providing, to the DC current control unit 35, the output limiter 90 for limiting output of the DC current control unit 35 by a predetermined limit value, DC voltage at the DC-side terminals D2 of the power conversion device 30 can be prevented from increasing beyond desired voltage. Thus, DC voltage at the DC-side terminals D2 of the power conversion device 30 can be reliably prevented from increasing beyond the rated operation range. Therefore, even in the case where DC voltage at the DC-side terminals E2 of the power conversion device 40 increases due to decrease in output power of the power conversion device 40 at the time of grid disturbance, increase in DC voltage at the DC-side terminals D2 on the power conversion device 30 side due to the above increase in DC voltage can be limited so as not to exceed the rated operation range. Thus, it becomes possible to detect grid disturbance while reliably keeping voltage of the DC grid bus 60 within the rated operation range.

In the above description, a power system including the electric generation grid 20 and the power transmission system 70 is shown as the power system 100. However, a power system may be formed by only the power transmission system 70 without the electric generation grid 20.

Embodiment 2

Hereinafter, with reference to the drawings, embodiment 2 of the present invention will be described focusing on difference from the above embodiment 1. The same parts as in the above embodiment 1 are denoted by the same reference characters and the description thereof is omitted.

Figure 11:
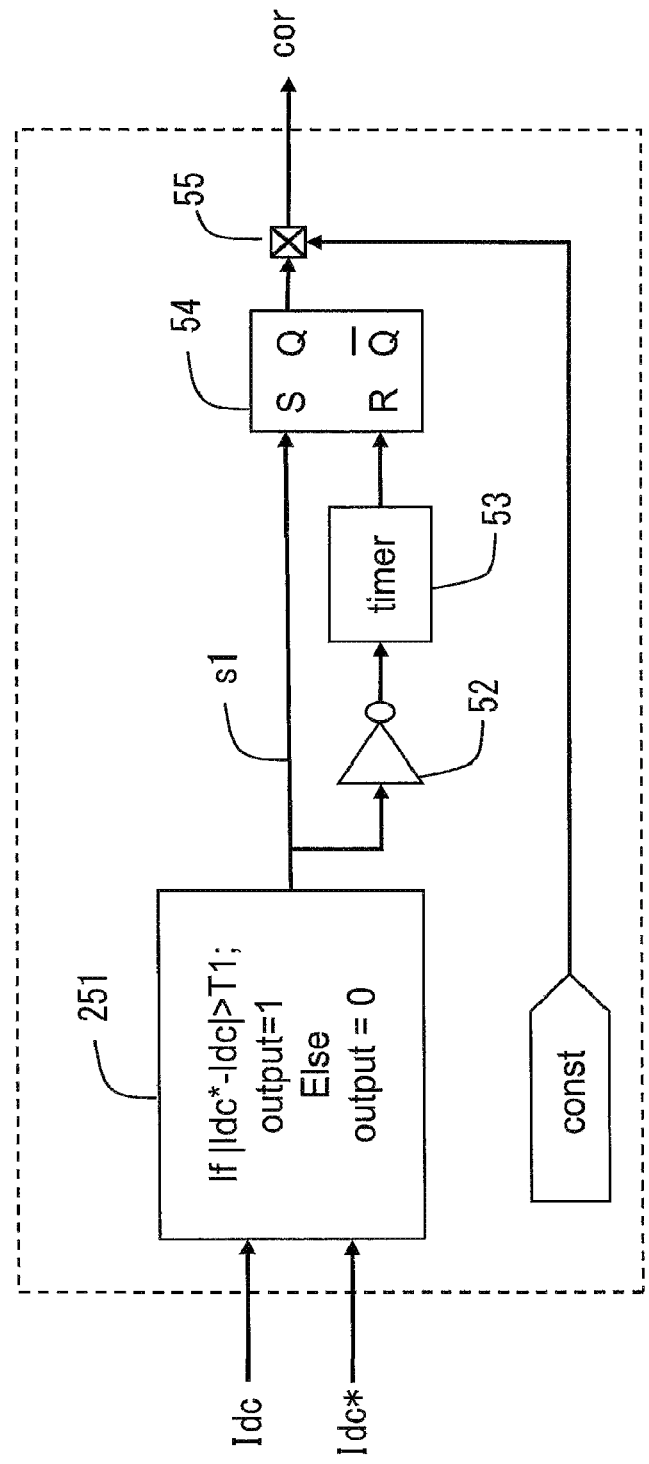
FIG. 11 is a block diagram showing the configuration of a protection control unit in a control device for a power converter according to embodiment 2 of the present invention.

FIG. 11 is a block diagram showing the configuration of a protection control unit 250 of the control device 31 for the power conversion device 30 according to embodiment 2 of the present invention.

A determination unit 251 of the protection control unit 250 in the present embodiment has a first threshold value T1 set for a deviation between DC current Idc of the power converter 32 and the DC current command Idc*. When having detected that the deviation between DC current Idc of the DC grid bus 60 and the DC current command Idc* exceeds the set first threshold value T1, the determination unit 251 outputs "1" as the determination information s1. Then, as in embodiment 1, the protection control unit 250 outputs correction information cor for decreasing the amplitude of the AC voltage command Vac*, thereby performing protection control of suppressing the amount of power received from the electric generation grid 20.

When having detected that a deviation between the DC current command Idc* and DC current Idc becomes equal to or smaller than the first threshold value T1, the determination unit 251 outputs "0" as determination information s1. Then, after a predetermined period has elapsed since the detection, the protection control unit 250 nullifies the correction information cor as "0", thereby stopping the protection control.

Hereinafter, an operation continuation function in the power conversion device 30 including the protection control unit 250 according to the present embodiment 2 in the case of grid disturbance of the demand area grid 80 will be described.

When grid disturbance occurs in the demand area grid 80, as described in embodiment 1, DC current Idc flowing through the DC grid bus 60 decreases. The protection control unit 250 detects the decrease in DC current Idc on the basis of the fact that the deviation between the DC current Idc and the DC current command Idc* exceeds the first threshold value T1, and executes protection control. By execution of protection control, AC power received by the power converter 32 is suppressed, and the DC current command Idc* is adjusted to be decreased so that the power converter 32 outputs power according to the received AC power. Thus, the deviation between the DC current Idc and the DC current command Idc* becomes equal to or smaller than the first threshold value T1, and after a predetermined period has elapsed, the protection control is stopped and normal operation is restarted.

In many cases, grid disturbance in the demand area grid 80 is instantaneous disturbance. Therefore, as described above, after a predetermined period has elapsed since execution of protection control, the protection control is stopped and normal operation is restarted. This predetermined period may be set beforehand in consideration of a general period of grid disturbance that occurs in the demand area grid 80.

After normal operation is restarted, if the grid disturbance in the demand area grid 80 is eliminated, the power conversion device 30, the power transmission system 70, and the power system 100 continue the normal operation as it is.

In the case where the grid disturbance has not been eliminated even after normal operation is restarted by the power conversion device 30, the power transmission system 70, and the power system 100, the protection control unit 250 detects the grid disturbance again and performs protection control again.

According to the power conversion device 30 of the present embodiment configured as described above, the same effects as in the above embodiment 1 are provided, and the power conversion device 30 detects voltage abnormality or the like of another grid interconnected to the output side of the power converter 32, on the basis of variation in DC current Idc, and performs protection control for suppressing the amount of power received from the electric generation grid 20. Therefore, it is not necessary to receive information for performing the protection control from another electrical facility, and it is possible to perform the protection control by the power conversion device 30 alone. In addition, the power conversion device 30 can detect voltage abnormality or the like of the output-side grid while keeping the output-side DC voltage within the rated operation range. Thus, it is possible to provide the power conversion device 30 that has decreased constraints in designing and has high performance. In addition, also in the power transmission system 70 and the power system 100 including the power conversion device 30 of the present embodiment, space saving and cost reduction can be achieved and constraints in designing can be decreased.

The determination unit 251 of the protection control unit 250 detects variation in the DC current Idc on the basis of a deviation between the DC current Idc and the DC current command Idc*. As described in embodiment 1, the DC current command Idc* is a command value generated so as to adjust DC power to be outputted on the basis of AC power received by the power converter 32, and is not a fixed value. Therefore, the determination unit 251 does not erroneously detect, as variation due to grid disturbance, variation in DC current Idc within the rated range during normal operation of the power conversion device 30, the power transmission system 70, and the power system 100. Thus, unintentional start of protection control is prevented, whereby operations of the power conversion device 30, the power transmission system 70, and the power system 100 can be more stabilized.

Embodiment 3

Hereinafter, with reference to the drawings, embodiment 3 of the present invention will be described focusing on difference from the above embodiment 1. The same parts as in the above embodiment 1 are denoted by the same reference characters and the description thereof is omitted.

Figure 12:
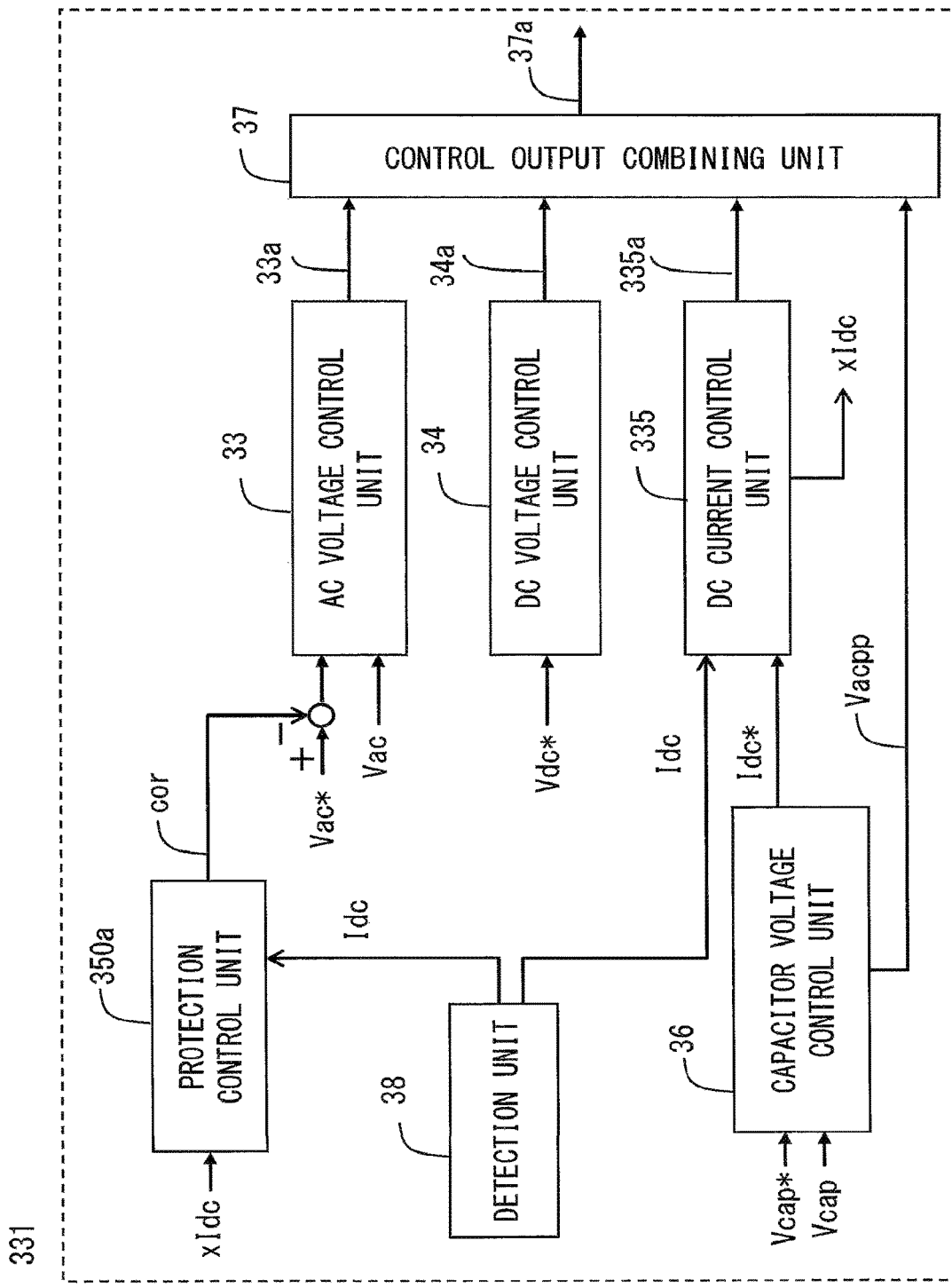
FIG. 12 is a block diagram showing the configuration of a control device for a power converter according to embodiment 3 of the present invention.

FIG. 12 is a block diagram showing the configuration of a control device 331 for controlling the power converter 32 according to embodiment 3 of the present invention.

Figure 13:
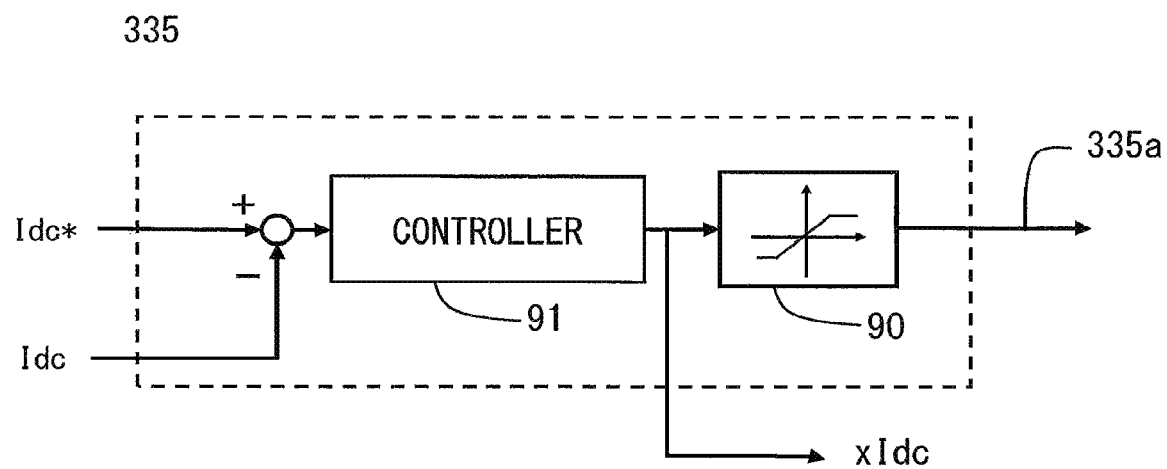
FIG. 13 is a block diagram showing the configuration of a DC current control unit in the control device for the power converter according to embodiment 3 of the present invention.

FIG. 13 is a block diagram showing the configuration of a DC current control unit 335 in the control device 331 shown in FIG. 12.

Figure 14:
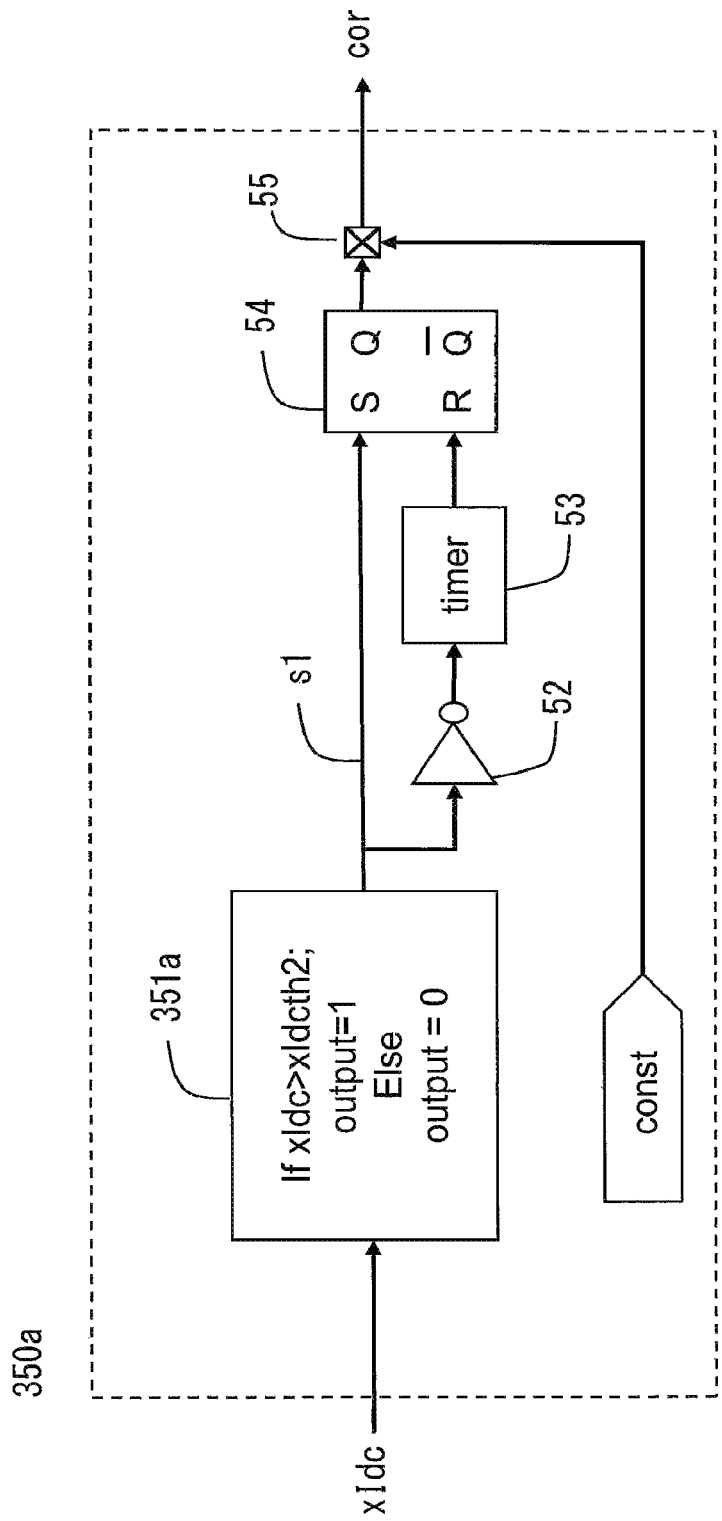
FIG. 14 is a block diagram showing a configuration example of a protection control unit in the control device for the power converter according to embodiment 3 of the present invention.

FIG. 14 is a block diagram showing the configuration of a protection control unit 350a in the control device 331 shown in FIG. 12.

As shown in FIG. 12, the control device 331 of the present embodiment is configured such that the DC current control unit 335 outputs an internal variable xIdc (the details thereof will be described below) and the outputted internal variable xIdc is inputted to the protection control unit 350a.

As shown in FIG. 13, the DC current control unit 335 includes a controller 91 which receives a deviation between the DC current command Idc* and DC current Idc and calculates the internal variable xIdc as a control amount. The internal variable xIdc is adjusted by the controller 91 so as to decrease the deviation between the DC current command Idc* and DC current Idc during normal operation of the power conversion device 30. The value of the internal variable xIdc outputted from the controller 91 is limited by being multiplied by a predetermined limiter value by an output limiter 90, thereby obtaining a DC control command 335a. Thus, by providing the output limiter 90, DC voltage outputted from the power converter 32 can be kept within the rated operation range. It is noted that a PI controller or the like is used as the controller 91.

A determination unit 351a of the protection control unit 350a shown in FIG. 14 has a second threshold value xIdcth2 indicating the adjustment range of the internal variable xIdc during normal operation of the power converter 32.

When having detected that the inputted internal variable xIdc exceeds the set second threshold value xIdcth2, the determination unit 351a outputs "1" as determination information s1, whereby protection control is performed. When having detected that the inputted internal variable xIdc becomes equal to or smaller than the second threshold value xIdcth2, the determination unit 351a outputs "0" as determination information s1, and after a predetermined period has elapsed since the detection, the protection control is stopped.

Hereinafter, an operation continuation control function in the power conversion device 30 including the protection control unit 350a according to the present embodiment 3 in the case of grid disturbance of the demand area grid 80 will be described.

When grid disturbance occurs in the demand area grid 80, as described above, DC current Idc flowing through the DC grid bus 60 decreases. The controller 91 of the DC current control unit 335 generates the internal variable xIdc so that DC current Idc follows the DC current command Idc*, as described above. When having detected that the internal variable xIdc exceeds the second threshold value xIdcth2, the protection control unit 350a performs protection control. By the protection control, AC power received by the power converter 32 is suppressed, and the DC current command Idc* is adjusted to be decreased so that the power converter 32 outputs DC power according to the received AC power. Thus, the deviation between the DC current Idc and the DC current command Idc* is reduced, the internal variable xIdc becomes equal to or smaller than the second threshold value xIdcth2, and after a predetermined period has elapsed, the protection control is stopped.

Figure 15:
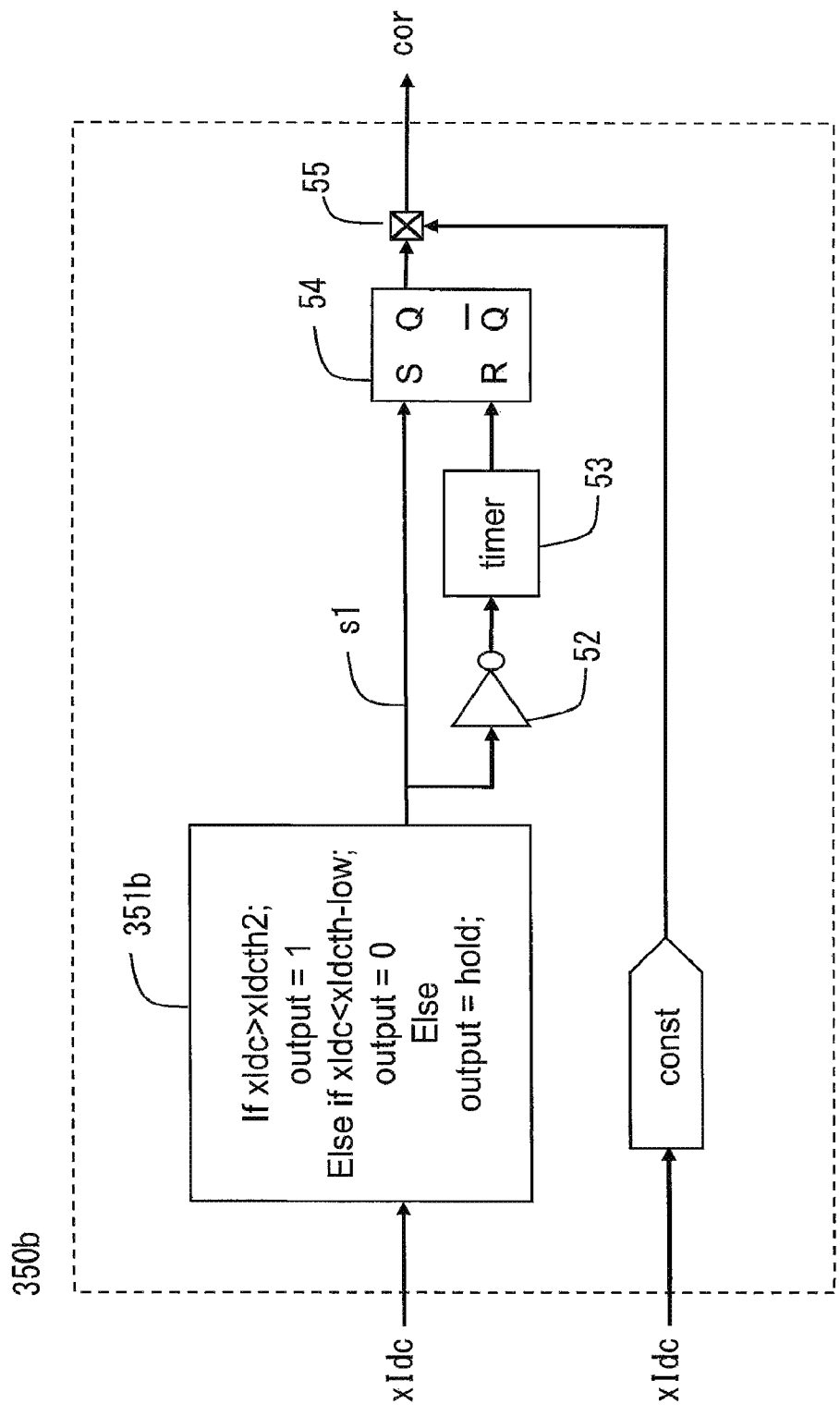
FIG. 15 is a block diagram showing another configuration example of a protection control unit in the control device for the power converter according to embodiment 3 of the present invention.

FIG. 15 is a block diagram showing the configuration of a protection control unit 350b different from the configuration of the protection control unit 350a shown in FIG. 14.

A determination unit 351b of the protection control unit 350b shown in FIG. 15 has the second threshold value xIdcth2, and a lower limit threshold value xIdcth-low set to be smaller than the second threshold value xIdcth2.

When having detected that the inputted internal variable xIdc exceeds the second threshold value xIdcth2, the determination unit 351b outputs "1" as determination information s1, whereby protection control is performed. When having detected that the inputted internal variable xIdc becomes equal to or smaller than the lower limit threshold value xIdcth-low, the determination unit 351b outputs "0" as determination information s1, and after a predetermined period has elapsed since the detection, the protection control is stopped.

Figure 16:
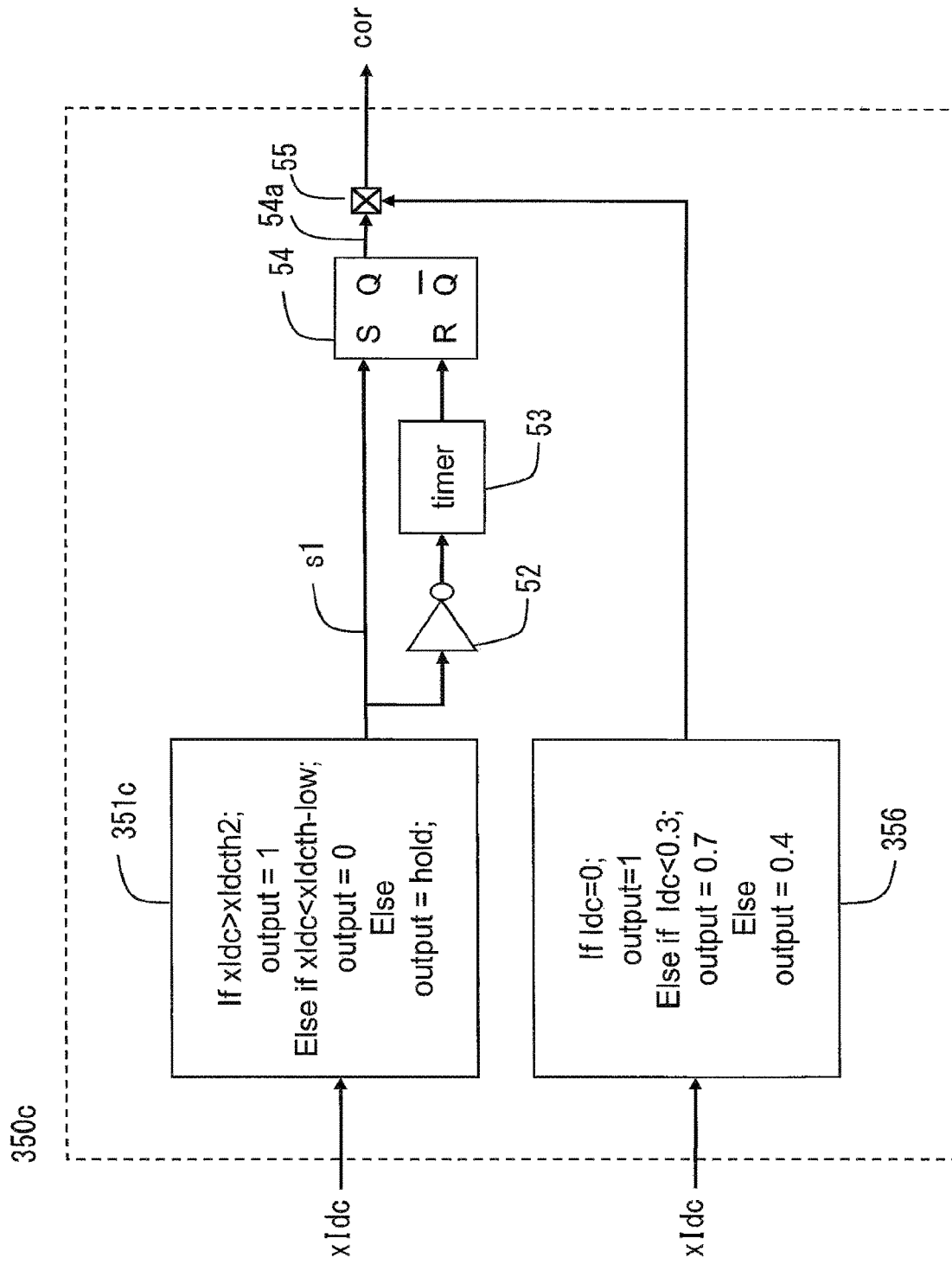
FIG. 16 is a block diagram showing another configuration example of a protection control unit in the control device for the power converter according to embodiment 3 of the present invention.

FIG. 16 is a block diagram showing the configuration of a protection control unit 350c different from the configurations of the protection control units 350a, 350b shown in FIG. 14 and FIG. 15.

The protection control unit 350c shown in FIG. 16 includes a correction amount adjustment unit 356 for adjusting a correction amount for the correction information cor in accordance with the detected value of DC current Idc. In the present embodiment, the correction amount adjustment unit 356 has three levels of correction values (1, 0.7, 0.4) according to the value of DC current Idc. Thus, the correction amount adjustment unit 356 corrects output 54a from the flip-flop circuit 54 in accordance with the value of DC current Idc, by the multiplier 55, thereby adjusting the correction amount of the correction information cor.

According to the power conversion device 30 of the present embodiment configured as described above, the same effects as in the above embodiment 1 are provided, and the power conversion device 30 detects voltage abnormality or the like of the grid interconnected to the output side of the power converter 32, on the basis of the internal variable xIdc for adjusting DC current Idc, and performs protection control for suppressing the amount of power received from the electric generation grid 20. The internal variable xIdc is a value calculated in the control device 331 of the power conversion device 30. Therefore, it is not necessary to receive information for performing the protection control from another electrical facility, and it is possible to perform the protection control by the power conversion device 30 alone.

The power conversion device 30 detects voltage abnormality on the output-side grid by using the internal variable xIdc based on DC current Idc varying in advance before DC voltage on the output side reaches threshold abnormality. Therefore, it is possible to detect voltage abnormality or the like of the output-side grid while keeping the output-side DC voltage within the rated operation range. Thus, it is possible to provide the power conversion device 30 that has decreased constraints in designing and has high performance. In addition, also in the power transmission system 70 and the power system 100 including the power conversion device 30 of the present embodiment, space saving and cost reduction can be achieved and constraints in designing can be decreased.

The protection control units 350a, 350b, 350c do not erroneously detect, as variation due to grid disturbance, variation in the internal variable xIdc based on variation in DC current Idc within the rated range during normal operation of the power conversion device 30, the power transmission system 70, and the power system 100. Therefore, operations of the power conversion device 30, the power transmission system 70, and the power system 100 can be more stabilized.

As described above, for the threshold values used for determination as to start and stop of the protection control, a hysteresis width is provided using different threshold values (second threshold value xIdcth2, lower limit threshold value xIdcth-low). Thus, unintentional start and stop of protection control are prevented, whereby operations of the power conversion device 30, the power transmission system 70, and the power system 100 can be more stabilized.

Since the correction amount of the correction information cor can be adjusted in accordance with the value of DC current Idc, it is possible to adjust the amount of power received from the electric generation grid 20 in accordance with the degree of grid disturbance.

The DC current control unit 335 shown in FIG. 13 is provided with the output limiter 90 for limiting output of the controller 91. However, the DC current control unit 335 may be configured without the output limiter 90.

Embodiment 4

Hereinafter, with reference to the drawings, embodiment 4 of the present invention will be described focusing on difference from the above embodiments 1, 2, 3. The same parts as in the above embodiments 1, 2, 3 are denoted by the same reference characters and the description thereof is omitted.

Modifications of the protection control unit 50 of the control device 31 shown in FIG. 5 in embodiment 1 will be described.

Figure 17:
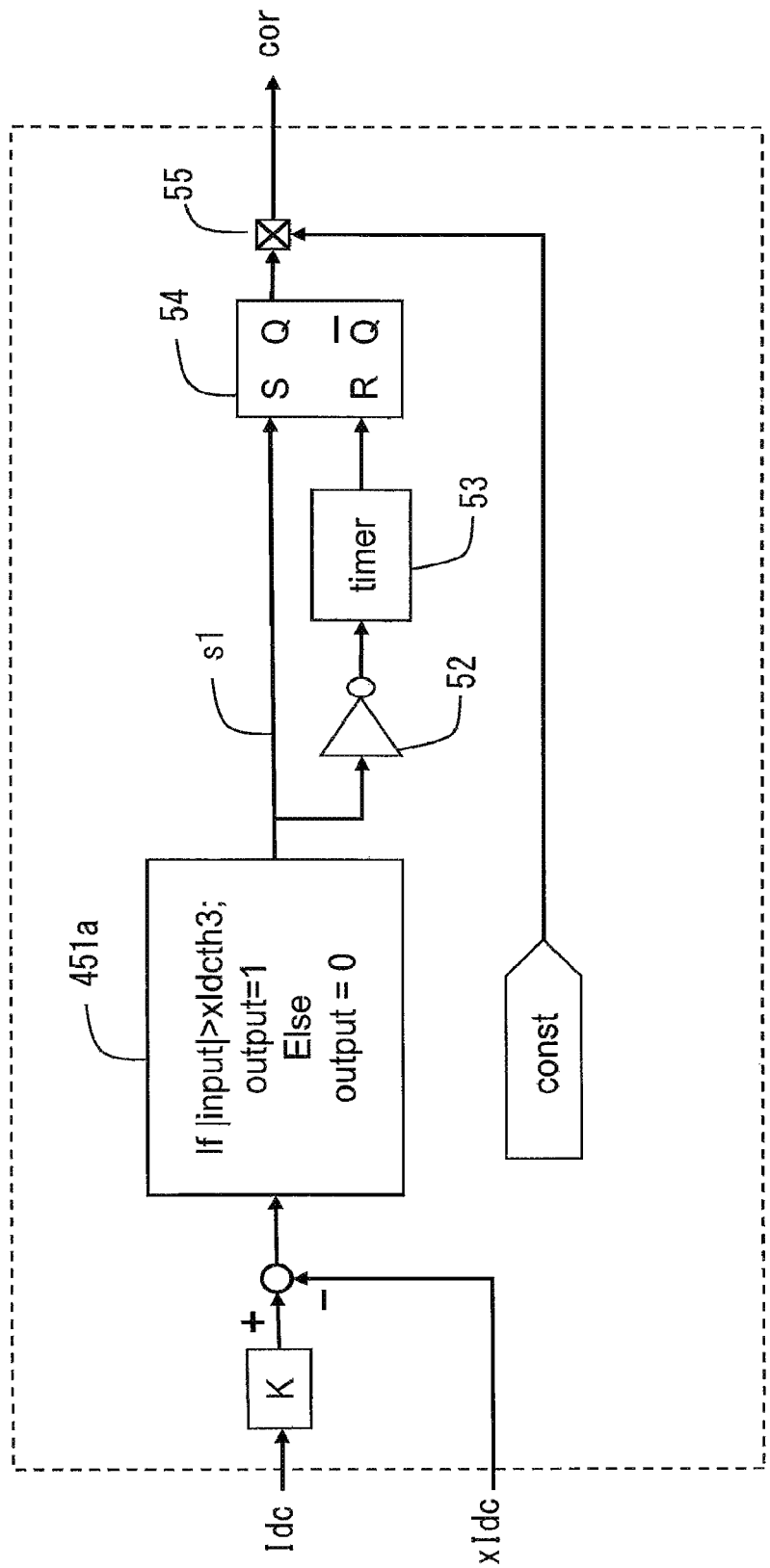
FIG. 17 is a block diagram showing a configuration example of a protection control unit in a control device for a power converter according to embodiment 4 of the present invention.

FIG. 17 is a block diagram showing the configuration of a protection control unit 450a according to embodiment 4 of the present invention.

Figure 18:
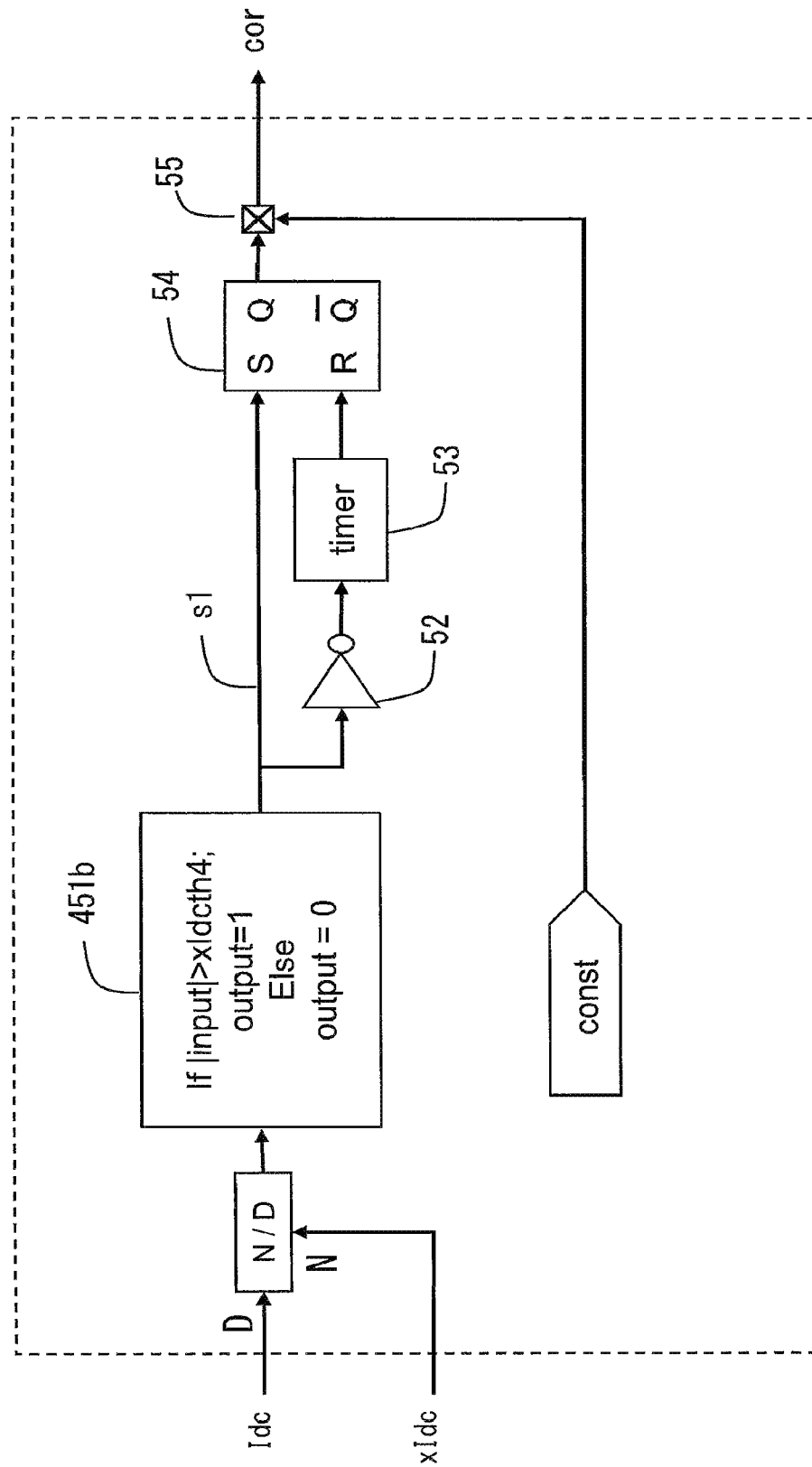
FIG. 18 is a block diagram showing another configuration example of a protection control unit in the control device for the power converter according to embodiment 4 of the present invention.

FIG. 18 is a block diagram showing the configuration of a protection control unit 450b different from the configuration of the protection control unit 450a shown in FIG. 17.

Normally, when the power conversion device 30 is performing normal operation, the DC current Idc and the internal variable xIdc are in a proportional relationship. However, if grid disturbance occurs in the demand area grid 80 and the DC current Idc decreases, the proportional relationship is broken. The protection control units 450a, 450b of the present embodiment perform protection control when the relationship between the DC current Idc and the internal variable xIdc varies beyond a predetermined proportional relationship.

First, control by the protection control unit 450a shown in FIG. 17 will be described.

The protection control unit 450a has a proportionality constant K indicating the proportional relationship between the DC current Idc and the internal variable xIdc during normal operation. A determination unit 451a has a third threshold value xIdcth3 set for error in the proportional relationship during normal operation of the power converter 32.

When having detected that a deviation between K×Idc and xIdc exceeds the third threshold value xIdcth3, the determination unit 451a outputs "1" as determination information s1, whereby protection control is performed. When having detected that the deviation between K×Idc and the internal variable xIdc becomes equal to or smaller than the third threshold value xIdcth3, the determination unit 451a outputs "0" as determination information s1, and after a predetermined period has elapsed since the detection, the protection control is stopped.

Next, control by the protection control unit 450b shown in FIG. 18 will be described.

When having detected that a value obtained by dividing the internal variable xIdc by DC current Idc exceeds a set fourth threshold value xIdcth4, a determination unit 451b of the protection control unit 450b outputs "1" as determination information s1. When having detected that a value obtained by dividing the internal variable xIdc by DC current Idc becomes equal to or smaller than the fourth threshold value xIdcth4, the determination unit 451b outputs "0" as determination information s1.

As described above, the protection control units 450a, 450b start and stop protection control by using the proportional relationship between the DC current Idc and the internal variable xIdc.

Further, the protection control unit may be configured as follows.

Figure 19:
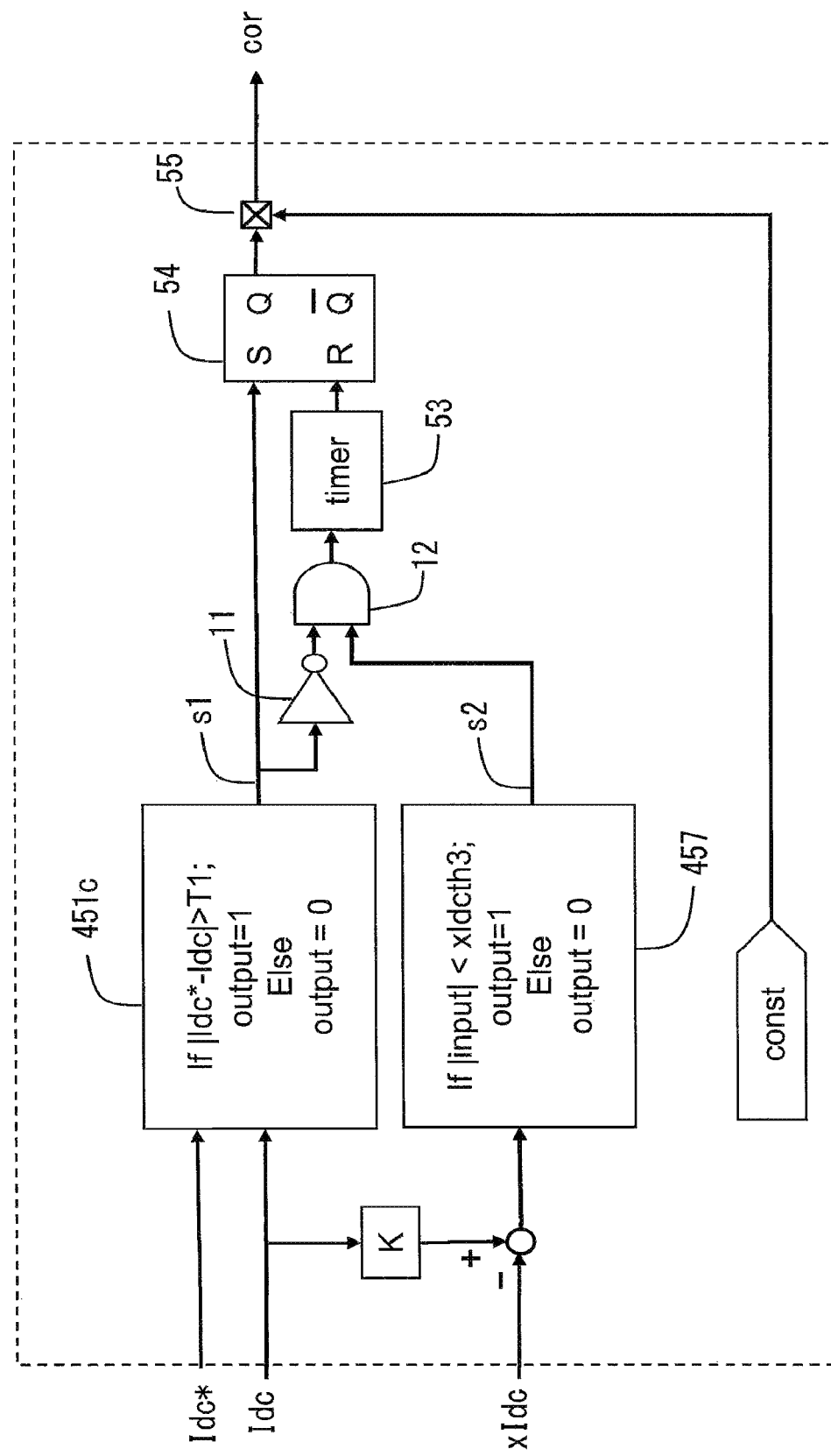
FIG. 19 is a block diagram showing another configuration example of a protection control unit in the control device for the power converter according to embodiment 4 of the present invention.

FIG. 19 is a block diagram showing the configuration of a protection control unit 450c in the control device for the power converter 32 according to embodiment 4 of the present invention.

When having detected that a deviation between the DC current Idc and the DC current command Idc* exceeds the first threshold value T1, a determination unit 451c of the protection control unit 450c outputs "1" as determination information s1. When having detected that a deviation between K×Idc and xIdc exceeds the third threshold value xIdcth3, the determination unit 457 outputs "0" as determination information s2. The determination information s1 is inputted to the set input terminal S of the flip-flop circuit 54, and meanwhile, the determination information s1 is, after inverted by an inverter 11, inputted also to one of terminals of the AND circuit 12. The determination information s2 is inputted to the other terminal of the AND circuit 12. Output of the AND circuit 12 is delayed by a predetermined period by the delay device 53 and then inputted to the reset input terminal R of the flip-flop circuit 54. In this way, when having detected that the deviation between the DC current Idc and the DC current command Idc* exceeds the first threshold value T1 and the deviation between K×Idc and xIdc exceeds the third threshold value xIdcth3, the protection control unit 450c outputs correction information cor, thereby performing protection control for suppressing the amount of power received from the electric generation grid 20.

When having detected that the deviation between the DC current Idc and the DC current command Idc* becomes equal to or smaller than the first threshold value T1 as a result of execution of the protection control, the determination unit 451c outputs "0" as determination information s1. When having detected that the deviation between K×Idc and xIdc becomes equal to or smaller than the third threshold value xIdcth3, the determination unit 457 outputs "1" as determination information s2. Output of the AND circuit 12 is delayed by a predetermined period by the delay device 53 and then inputted to the reset input terminal R of the flip-flop circuit 54. Thus, when the predetermined period has elapsed since the detections by the determination unit 451c and the determination unit 457, the protection control unit 450c nullifies the correction information cor as "0", thereby stopping the protection control.

According to the power conversion device 30 of the present embodiment configured as described above, the same effects as in the above embodiment 1 are provided, and the power conversion device 30 detects voltage abnormality or the like of the grid interconnected to the output side of the power converter 32, on the basis of the proportional relationship of the internal variable xIdc for adjusting DC current Idc, and performs protection control for suppressing the amount of power received from the electric generation grid 20. The internal variable xIdc is a value calculated in the control device 331 of the power conversion device 30. Therefore, it is not necessary to receive information for performing the protection control from another electrical facility, and it is possible to perform the protection control by the power conversion device 30 alone.

The power conversion device 30 detects voltage abnormality in the output-side grid by using the proportional relationship of the internal variable xIdc based on DC current Idc varying in advance before DC voltage on the output side reaches threshold abnormality. Therefore, it is possible to detect voltage abnormality or the like of the output-side grid while keeping the output-side DC voltage within the rated operation range. Thus, it is possible to provide the power conversion device 30 that has decreased constraints in designing and has high performance. In addition, also in the power transmission system 70 and the power system 100 including the power conversion device 30 of the present embodiment, space saving and cost reduction can be achieved and constraints in designing can be decreased.

The protection control units 450a, 450b, 450c do not erroneously detect, as variation due to grid disturbance, variation in the proportional relationship of the internal variable xIdc according to variation in DC current Idc within the rated range during normal operation of the power conversion device 30, the power transmission system 70, and the power system 100. Therefore, operations of the power conversion device 30 and the power transmission systems 70, the power system 100 can be more stabilized.

In determinations for start and stop of protection control, a plurality of threshold values, i.e., the first threshold value T1 and the third threshold value xIdcth3 are used, whereby grid disturbance detection can be performed with high reliability and erroneous detection can be prevented. In addition, since a hysteresis width is provided using two different threshold values (first threshold value T1, third threshold value xIdcth3), unintentional start and stop of protection control can be prevented. Thus, operations of the power conversion device 30, the power transmission system 70, and the power system 100 can be more stabilized.

In the protection control unit 450c, two conditions, i.e., a deviation between the DC current Idc and the DC current command Idc* and a deviation between K×Idc and xIdc, are used for detecting voltage abnormality in the output-side grid. However, the combination of conditions is not limited to the above combination of the two conditions. For example, as two conditions, a value obtained by dividing the internal variable xIdc by DC current Idc and a deviation between the DC current Idc and the DC current command Idc* may be combined, and thus the combination may be selected as appropriate.

Embodiment 5

Hereinafter, with reference to the drawings, embodiment 5 of the present invention will be described focusing on difference from the above embodiments 1, 2, 3, 4. The same parts as in the above embodiments 1, 2, 3, 4 are denoted by the same reference characters and the description thereof is omitted.

A modification of the protection control unit 50 of the control device 31 shown in FIG. 5 in embodiment 1 will be described.

Figure 20:
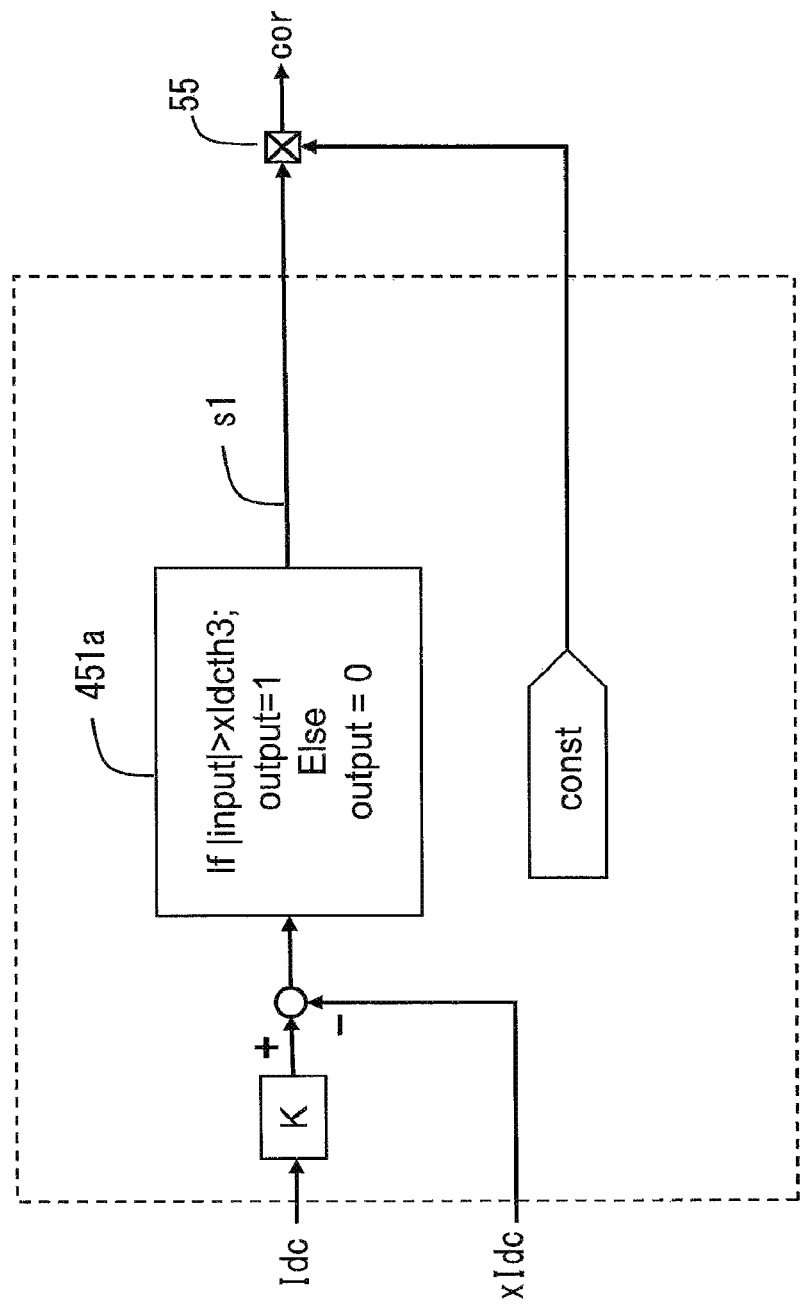
FIG. 20 is a block diagram showing a configuration example of a protection control unit in a control device for a power converter according to embodiment 5 of the present invention.

FIG. 20 is a block diagram showing the configuration of a protection control unit 550 according to embodiment 5 of the present invention.

Figure 21:
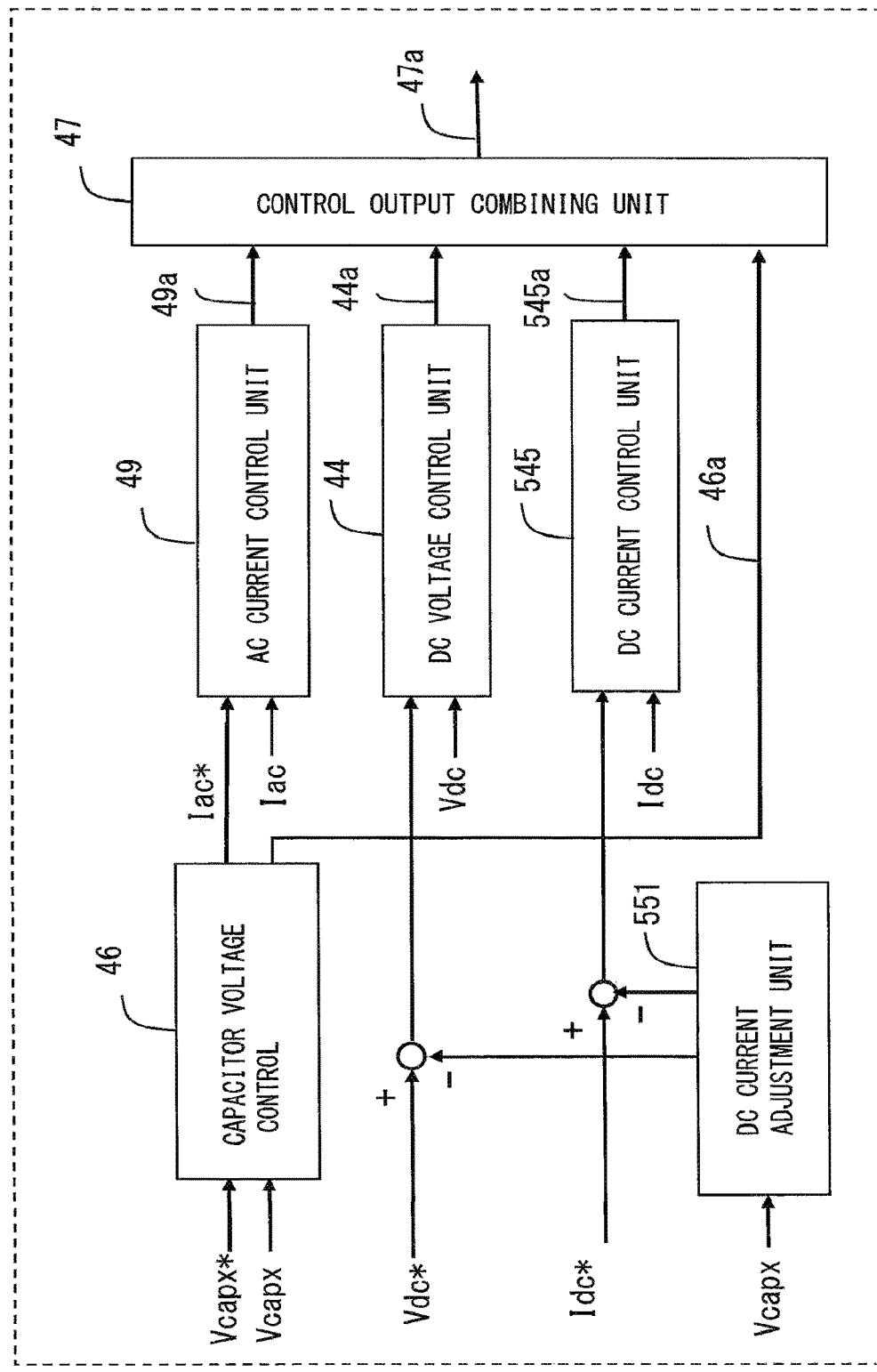
FIG. 21 is a block diagram showing the configuration of a control device for an inverse power converter according to embodiment 5 of the present invention.

FIG. 21 is a block diagram showing the configuration of a control device 541 for the inverse power converter 42 according to embodiment 5 of the present invention.

The protection control unit 550 shown in FIG. 20 has a configuration obtained by removing the inverter 52, the delay device 53, and the flip-flop circuit 54 in the protection control unit 450a shown in FIG. 17 in embodiment 4. Therefore, when having detected that a deviation between K×Idc and xIdc becomes equal to or smaller than the set third threshold value xIdcth3, the determination unit 451a immediately nullifies the correction information cor without elapse of a predetermined period, whereby protection control is stopped.

The control device 541 for the inverse power converter 42 shown in FIG. 21 has a configuration obtained by adding a DC current adjustment unit 551 as an adjustment unit and a DC current control unit 545 to the control device 41 shown in embodiment 1.

The DC current adjustment unit 551 is configured to detect occurrence of grid disturbance in the demand area grid 80 on the basis of variation in voltage Vcapx of the capacitor 3 in the inverse power converter 42. When having detected that grid disturbance has occurred, the DC current adjustment unit 551 corrects the DC voltage command Vdc* and the DC current command Idc* so as to reduce DC current Idc flowing into the inverse power converter 42.

In addition, the DC current adjustment unit 551 detects settlement of grid disturbance in the demand area grid 80 on the basis of settlement of variation in voltage Vcapx of the capacitor 3 in the inverse power converter 42. Then, when having detected settlement of grid disturbance, the DC current adjustment unit 551 stops correcting the DC voltage command Vdc* and the DC current command Idc*.

The DC current control unit 545 performs control calculation so that DC current Idc flowing into the inverse power converter 42 follows the corrected DC current command Idc*, thereby generating and outputting a DC control command 545a. The DC current control unit 545 is configured so as to operate when the DC current adjustment unit 551 has detected grid disturbance in the demand area grid 80.

The DC voltage control unit 44 performs control calculation so that DC voltage Vdc at the DC-side terminals E2 inputted to the inverse power converter 42 follows the corrected DC voltage command Vdc*, thereby generating and outputting a DC control command 44a. Thus, the DC current Idc is suppressed by the DC control command 44a and the DC control command 545a generated using the corrected DC voltage command Vdc* and the corrected DC current Idc*.

Hereinafter, an operation continuation control function in the power conversion device 30 according to the present embodiment 5 in the case of grid disturbance of demand area grid 80 will be described.

When grid disturbance occurs in the demand area grid 80, the DC current adjustment unit 551 of the power conversion device 40 connected to the demand area grid 80 side detects the grid disturbance. Then, the DC current adjustment unit 551 corrects the DC voltage command Vdc* and the DC current command Idc* so as to reduce DC current Idc flowing into the inverse power converter 42. Thus, the DC current Idc is reduced.

Normally, when the power conversion device 30 is performing normal operation, the DC current Idc and the internal variable xIdc are in a proportional relationship. However, in the case where the power conversion device 40 is performing control of suppressing the DC current Idc as described above, the proportional relationship is broken. In this case, as in the determination unit 451a of embodiment 4, the determination unit 451a of the protection control unit 550 in the power conversion device 30 detects that a deviation between K×Idc and xIdc exceeds the set third threshold value xIdcth3, and outputs "1" as determination information s1, whereby protection control is performed.

The correction of the DC voltage command Vdc* and the DC current command Idc* by the DC current adjustment unit 551 of the power conversion device 40 is continued while grid disturbance is occurring in the demand area grid 80, and the correction is stopped when settlement of the grid disturbance is detected. After the correction of the DC voltage command Vdc* and the DC current command Idc* is stopped and control of suppressing the DC current Idc is stopped, the determination unit 451a in the power conversion device 30 detects that the deviation between K×Idc and the internal variable xIdc becomes equal to or smaller than the set third threshold value xIdcth3, whereby the protection control is stopped immediately.

According to the power conversion device 30 of the present embodiment configured as described above, the same effects as in the above embodiment 1 are provided, and the power conversion device 30 detects voltage abnormality or the like of the grid interconnected to the output side of the power converter 32, on the basis of the proportional relationship of the internal variable xIdc for adjusting DC current Idc, and performs protection control for suppressing the amount of power received from the electric generation grid 20. The internal variable xIdc is a value calculated in the control device 331 of the power conversion device 30. Therefore, it is not necessary to receive information for performing the protection control from another electrical facility, and it is possible to perform the protection control by the power conversion device 30 alone.

The power conversion device 30 detects voltage abnormality on the output-side grid by using the proportional relationship of the internal variable xIdc based on DC current Idc varying in advance before DC voltage on the output side reaches threshold abnormality. Therefore, it is possible to detect voltage abnormality or the like of the output-side grid while keeping the output-side DC voltage within the rated operation range. Thus, it is possible to provide the power conversion device 30 that has decreased constraints in designing and has high performance. In addition, also in the power transmission system 70 and the power system 100 including the power conversion device 30 of the present embodiment, space saving and cost reduction can be achieved and constraints in designing can be decreased.

The protection control unit 550 does not erroneously detect, as variation due to grid disturbance, variation in the proportional relationship of the internal variable xIdc according to variation in DC current Idc within the rated range during normal operation of the power conversion device 30, the power transmission system 70, and the power system 100. Therefore, operations of the power conversion device 30, the power transmission system 70, and the power system 100 can be more stabilized.

In addition, since the power conversion device 40 connected to the demand area grid 80 side detects grid disturbance in the demand area grid 80 and reduces DC current Idc, it is possible to decrease DC current Idc at an earlier stage than in the case where DC current Idc naturally decreases. Therefore, the power conversion device 30 can start protection control swiftly after the detection of grid disturbance by the power conversion device 40. Thus, imbalance between received DC power and outputted AC power of the power conversion device 40 is swiftly suppressed and the power conversion device 40 can be stably operated.

In embodiment 1, a period required until grid disturbance in the demand area grid 80 settles is set beforehand, and protection control is stopped after the period has elapsed. In the present embodiment, the power conversion device 40 detects settlement of grid disturbance in the demand area grid 80, and reduces DC current Idc during only a period in which the grid disturbance is occurring. Therefore, the above predetermined period becomes unnecessary, and thus a time required until normal operation is restarted from when settlement of grid disturbance is detected can be shortened.

In the above description, the DC current adjustment unit 551 in the power conversion device 40 detects grid disturbance on the basis of variation in voltage Vacx of the capacitor 3 in the inverse power converter 42. However, the way of detection is not limited thereto. For example, the DC current adjustment unit 551 may detect grid disturbance on the basis of information about AC voltage at the AC-side terminals E1 of the inverse power converter 42. Alternatively, for example, the detection may be performed on the basis of information about both of voltage variation in the capacitor 3 and AC voltage at the AC-side terminals E1.

The protection control unit 550 of the present embodiment 5 has a configuration obtained by removing the inverter 52, the delay device 53, and the flip-flop circuit 54 in the protection control unit 450a shown in FIG. 17 in embodiment 4. Likewise, the protection control unit having a configuration in which the above circuits are removed may be applied to the protection control units 350a, 350b, 350c, 450b, 450c shown in FIGS. 14, 15, 16, 18, 19, 20.

It is noted that, within the scope of the present invention, the above embodiments may be freely combined with each other, or each of the above embodiments may be modified or simplified as appropriate.

The invention claimed is:

1. A power conversion device comprising:
a power converter which is connected to an electric generation grid and which converts AC power received from the electric generation grid to DC power and transmits the DC power via DC bus; and
a control device for controlling the power converter, wherein
the control device includes circuitry configured as
a detection unit for detecting DC current of the DC bus,
an AC voltage control unit for causing AC voltage at a power reception end of the power converter serving as voltage of the electric generation grid, to follow an AC voltage command,
a DC current control unit for causing the DC current to follow a DC current command, and
a protection control unit for performing protection control for suppressing an amount of power received from the electric generation grid, by decreasing an amplitude of the AC voltage command, and
the protection control unit is further configured to detect, based on a variation in the DC current, an abnormality in another grid to which power is supplied from the power converter via the DC bus, and to perform the protection control when detecting the abnormality, and
the control device generates an output voltage command for the power converter on the basis of output of the AC voltage control unit and output of the DC current control unit.

2. The power conversion device according to claim 1, wherein
the control device generates instantaneous voltage reduction in the connected electric generation grid by the protection control.

3. The power conversion device according to claim 1, wherein
when a deviation between the DC current and the DC current command exceeds a set first threshold value, the protection control unit performs the protection control.

4. The power conversion device according to claim 1, wherein
the DC current control unit includes a controller which receives a deviation between the DC current command and the DC current and calculates a control amount, and
when the control amount exceeds a set second threshold value, the protection control unit performs the protection control.

5. The power conversion device according to claim 1, wherein
the DC current control unit includes a controller which receives a deviation between the DC current command and the DC current and calculates a control amount, and
when a relationship between the DC current and the control amount varies beyond a predetermined proportional relationship, the protection control unit performs the protection control.

6. The power conversion device according to claim 1, wherein
the DC current control unit includes an output limiter for limiting output of the DC current control unit by a predetermined limit value.

7. The power conversion device according to claim 1, wherein
the power converter includes a plurality of leg circuits connected in parallel between the positive and negative DC bus, the leg circuits each having a positive arm and a negative arm connected in series, and being connected to AC lines for respective phases,
each of the positive arm and the negative arm of each leg circuit includes a plurality of unit converter cells connected in series, the unit converter cells each being composed of: a series body including a plurality of semiconductor elements connected in series to each other; and a capacitor connected in parallel to the series body, and
the control device generates the DC current command so that voltage of the capacitor in each unit converter cell follows a capacitor voltage command.

8. The power conversion device according to claim 1, wherein
the protection control unit stops the protection control in response to return of the variation in the DC current.

9. The power conversion device according to claim 1, wherein
the protection control unit stops the protection control, when one of the deviation between the DC current command and the DC current, a control amount calculated on the basis of input of the deviation between the DC current command and the DC current, and a proportional relationship between the DC current and the control amount, falls within a corresponding set range.

10. The power conversion device according to claim 8, wherein
the protection control unit performs the stop of the protection control after a set period has elapsed since the return of the variation in the DC current.

11. The power conversion device according to claim 9, wherein
the protection control unit performs the stop of the protection control after a set period has elapsed since return of one of the control amount and the proportional relationship between the DC current and the control amount into the corresponding set range.

12. The power conversion device according to claim 1, wherein
   power transmitted from the power converter is supplied to a demand area grid via an inverse power converter which converts DC power to AC power.

13. A power system comprising:
   the power conversion device according to claim 12; and
   the electric generation grid including:
      at least one electric generation device; and a generation-side power conversion device for adjusting generated power of the electric generation device, wherein
   voltage of the electric generation grid is controlled using the AC voltage command by the control device of the power conversion device, and
   the generation-side power conversion device suppresses the generated power of the electric generation device, in accordance with the protection control by the protection control unit.

14. The power system according to claim 13, wherein
   the generation-side power conversion device has a Fault Ride Through function for suppressing the generated power and continuing operation when instantaneous voltage reduction occurs in the electric generation grid.

15. The power conversion device according to claim 2, wherein
   when a deviation between the DC current and the DC current command exceeds a set first threshold value, the protection control unit performs the protection control.

16. The power conversion device according to claim 2, wherein
   the DC current control unit includes a controller which receives a deviation between the DC current command and the DC current and calculates a control amount, and
   when the control amount exceeds a set second threshold value, the protection control unit performs the protection control.

17. The power system according to claim 13 further comprising:
   the inverse power converter; and
   a control device for controlling the inverse power converter, wherein
   the control device for the inverse power converter includes a DC voltage control unit for causing DC voltage of the inverse power converter to follow a DC voltage command, and an AC current control unit for causing AC current of the inverse power converter to follow an AC current command, and
   the control device for the inverse power converter generates an output voltage command for the inverse power converter on the basis of output of the DC voltage control unit and output of the AC current control unit.

18. The power system according to claim 17, wherein
   the control device for the inverse power converter further includes an adjustment unit for adjusting the DC current.

19. The power system according to claim 18, wherein
   the adjustment unit adjusts the DC current on the basis of variation in AC voltage on an output side of the inverse power converter.

20. The power system according to claim 18, wherein
   the inverse power converter includes at least one converter having: a series body including a plurality of semiconductor elements connected in series to each other; and a capacitor connected in parallel to the series body, and
   the adjustment unit adjusts the DC current on the basis of variation in voltage of the capacitor in the inverse power converter.

21. A power conversion device comprising:
   a power converter which is connected to an electric generation grid and which converts AC power received from the electric generation grid to DC power and transmits the DC power via DC bus; and
   a control device for controlling the power converter, wherein
   the control device includes circuitry configured as
      a detection unit for detecting DC current of the DC bus,
      an AC voltage control unit for causing AC voltage at a power reception end of the power converter serving as voltage of the electric generation grid, to follow an AC voltage command,
      a DC current control unit for causing the DC current to follow a DC current command, and
      a protection control unit for performing protection control for suppressing an amount of power received from the electric generation grid, by decreasing an amplitude of the AC voltage command, and
   the protection control unit is configured to detect, on the basis of variation in the DC current, an abnormality in another grid to which power is supplied from the power converter via the DC bus, and configured to perform the protection control when detecting the abnormality,
   the control device generates an output voltage command for the power converter on the basis of output of the AC voltage control unit and output of the DC current control unit, and
   the DC current control unit includes an output limiter for limiting output of the DC current control unit by a predetermined limit value.

* * * * *